(12) United States Patent
Shan et al.

(10) Patent No.: US 11,301,126 B2
(45) Date of Patent: Apr. 12, 2022

(54) ICON CONTROL METHOD AND TERMINAL

(71) Applicant: Huawei Technologies Co., Ltd., Shenzhen (CN)

(72) Inventors: Zhenwei Shan, Shenzhen (CN); Zhu Liu, Shenzhen (CN); Xi Huang, Shenzhen (CN); Kai Qian, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/990,636

(22) Filed: Aug. 11, 2020

(65) Prior Publication Data

US 2020/0371656 A1 Nov. 26, 2020

Related U.S. Application Data

(63) Continuation of application No. 15/508,954, filed as application No. PCT/CN2015/085078 on Jul. 24, 2015, now Pat. No. 10,754,535.

(30) Foreign Application Priority Data

Sep. 4, 2014 (CN) .......................... 201410448877.7

(51) Int. Cl.
*G06F 3/0486* (2013.01)
*G06F 3/04817* (2022.01)
(Continued)

(52) U.S. Cl.
CPC .......... *G06F 3/0486* (2013.01); *G06F 3/0484* (2013.01); *G06F 3/04817* (2013.01); *G06F 3/04883* (2013.01)

(58) Field of Classification Search
CPC ............... G06F 3/04817; G06F 3/0488; G06F 3/04883; G06F 3/0486
See application file for complete search history.

(56) References Cited

U.S. PATENT DOCUMENTS 6,362,842 B1 * 3/2002 Tahara ................ G06F 3/04812
715/705
8,423,911 B2 4/2013 Chaudhri
(Continued)

FOREIGN PATENT DOCUMENTS

AU 2014100582 A4 7/2014
CN 101836182 A 9/2010
(Continued)

OTHER PUBLICATIONS

Anson Alexander, "iPhone 5—How to Create Folders for Apps," Apr. 16, 2013, Youtube, pp. 1-7.

*Primary Examiner* — Justin S Lee
(74) *Attorney, Agent, or Firm* — Conley Rose, P.C.

(57) ABSTRACT

An icon control method and terminal that include detecting first input of a user, moving a first icon towards a second icon in response to the detected first input, instructing to perform a first operation on the first icon and the second icon when a distance between the first icon and the second icon falls within a first distance range, and that in the first distance range, duration in which the first icon is in a staying state is greater than a first preset time length, and instructing to perform a second operation on the first icon and the second icon when the distance between the first icon and the second icon falls within a second distance range, and that the first icon is in the staying state in the second distance range.

20 Claims, 15 Drawing Sheets

(51) Int. Cl.
*G06F 3/0484* (2022.01)
*G06F 3/04883* (2022.01)

(56) References Cited

U.S. PATENT DOCUMENTS

| | | |
|---|---|---|
| 2006/0048069 A1 | 3/2006 | Igeta |
| 2009/0058821 A1* | 3/2009 | Chaudhri ............ G06F 3/0486 345/173 |
| 2009/0178008 A1 | 7/2009 | Herz et al. |
| 2011/0090165 A1 | 4/2011 | Oh et al. |
| 2011/0249076 A1 | 10/2011 | Zhou et al. |
| 2011/0252346 A1 | 10/2011 | Chaudhri |
| 2012/0287071 A1 | 11/2012 | Wang et al. |
| 2013/0002600 A1* | 1/2013 | McCracken ............ G06F 3/044 345/174 |
| 2013/0019200 A1 | 1/2013 | Montague |
| 2013/0174069 A1 | 7/2013 | Lee |
| 2013/0187866 A1 | 7/2013 | Kim et al. |
| 2014/0082565 A1 | 3/2014 | Suzuki |
| 2014/0111428 A1 | 4/2014 | Ho |
| 2014/0165006 A1 | 6/2014 | Chaudhri et al. |
| 2015/0046861 A1* | 2/2015 | Kirkpatrick ......... G06F 3/04883 715/769 |
| 2015/0160829 A1 | 6/2015 | Du |
| 2015/0253970 A1 | 9/2015 | Cheng et al. |
| 2015/0277710 A1* | 10/2015 | Lee ....................... G06F 3/0488 715/822 |
| 2016/0041700 A1 | 2/2016 | Beavers et al. |
| 2016/0139748 A1 | 5/2016 | Iwaizumi |
| 2016/0274773 A1 | 9/2016 | Koge |

FOREIGN PATENT DOCUMENTS

| | | |
|---|---|---|
| CN | 102033710 A | 4/2011 |
| CN | 102289352 A | 12/2011 |
| CN | 102591569 A | 7/2012 |
| CN | 103116456 A | 5/2013 |
| CN | 103294401 A | 9/2013 |
| CN | 103631504 A | 3/2014 |
| CN | 103838457 A | 6/2014 |
| CN | 104238877 A | 12/2014 |
| EP | 3190502 A1 | 7/2017 |

* cited by examiner

ICON CONTROL METHOD AND TERMINAL

CROSS-REFERENCE TO RELATED APPLICATIONS

This application is a continuation of U.S. patent application Ser. No. 15/508,954, filed on Mar. 6, 2017, which is a National Stage of International Patent Application No. PCT/CN2015/085078, filed on Jul. 24, 2015, which claims priority to Chinese Patent Application No. 201410448877.7, filed on Sep. 4, 2014. All of the aforementioned patent applications are hereby incorporated by reference in their entireties.

TECHNICAL FIELD

The present disclosure relates to the communications field, and in particular, to an icon control method and a terminal.

BACKGROUND

A folder and various application programs or files are generally disposed in a user interface of a terminal, for example, a user interface of a smartphone or a computer. A user may manage the application programs or the files by using a folder, and the user may also create a folder and rearrange icons in the user interface by dragging an application program or a file.

There may be many icon control operations, and two operations of them, for example, are respectively a first operation and a second operation. It is assumed that the first operation is a replace/push-away operation, and the second operation is a create folder and combine icon operation (which is also referred to as a "combine operation"). Two icons on which an operation is performed are respectively referred to as a first icon and a second icon. Currently, a manner of determining the two operations is generally touching and holding the first icon to enter an editing mode, dragging the first icon towards the second icon, where when a dragging speed is less than a preset value, a system determines it as a staying state, and performing the first operation of the first icon replacing or pushing away the second icon if a distance between the first icon and the second icon is less than a first preset distance and is greater than a second preset distance, and the first icon is in the staying state, or performing the second operation of creating a folder and putting the first icon and the second icon together in the folder when the distance is less than the second preset distance, and the first icon is in the staying state.

However, in actual application, when the second operation needs to be performed on the first icon and the second icon, because icon dragging necessarily includes a far-to-near process, when passing a distance range between the first preset distance and the second preset distance, the first icon is prone to be captured to perform the first operation with the second icon, that is, an incorrect operation different from a user's expected operation is caused, and the user may need to attempt many times before successfully implementing the second operation.

SUMMARY

Embodiments of the present disclosure provide an icon control method and a terminal, to resolve, without affecting an existing operation habit of a user, a problem that a terminal falsely responds when the user drags an icon.

A first aspect of the embodiments of the present disclosure provides an icon control method, applied to a terminal that displays a first icon and a second icon, and the method includes: detecting first input of a user, moving the first icon towards the second icon in response to the detected first input, instructing to perform a first operation on the first icon and the second icon when a distance between the first icon and the second icon falls within a first distance range, and duration in which the first icon is in a staying state is greater than a first preset time length when the distance between the first icon and the second icon falls within the first distance range, wherein two endpoints of the first distance range are respectively a first preset distance and a second preset distance, and the second preset distance is less than the first preset distance, and/or instructing to perform a second operation on the first icon and the second icon when the distance between the first icon and the second icon falls within a second distance range, and the first icon is in the staying state in the second distance range, wherein two endpoints of the second distance range are respectively 0 and the second preset distance, and the second preset distance is not less than 0, wherein the second operation is an operation different from the first operation.

With reference to the first aspect of the embodiments of the present disclosure, in a first implementation manner of the first aspect of the embodiments of the present disclosure, after the detecting first input of a user, the method further includes detecting the distance between the first icon and the second icon, detecting the duration in which the first icon is in the staying state, continuing to perform the detecting the distance between the first icon and the second icon when the distance between the first icon and the second icon falls beyond the first distance range and the second distance range, and continuing to perform the detecting the duration in which the first icon is in the staying state when the distance between the first icon and the second icon falls within the first distance range, and duration in which the first icon is in the staying state is not greater than the first preset time length when the distance between the first icon and the second icon falls within the first distance range.

With reference to the first aspect or the first implementation manner of the first aspect of the embodiments of the present disclosure, in a second implementation manner of the first aspect of the embodiments of the present disclosure, after the moving the first icon towards the second icon, the method further includes displaying an inner circular frame and an outer circular frame with a center at a center point of the second icon, where a radius of the inner circular frame is set to the second preset distance, and a radius of the outer circular frame is set to the first preset distance.

With reference to any one of the first aspect to the second implementation manners of the first aspect of the embodiments of the present disclosure, in a third implementation manner of the first aspect of the embodiments of the present disclosure, the distance between the first icon and the second icon is specifically a distance between a center point of the first icon and the center point of the second icon.

With reference to any one of the first aspect to the third implementation manners of the first aspect of the embodiments of the present disclosure, in a fourth implementation manner of the first aspect of the embodiments of the present disclosure, the first operation is a replace operation or a push-away operation, and the second operation is a combine operation, or the first operation is a combine operation, and the second operation is a replace operation or a push-away operation.

With reference to the fourth implementation manner of the first aspect of the embodiments of the present disclosure, in a fifth implementation manner of the first aspect of the embodiments of the present disclosure, the instructing to perform a first operation on the first icon and the second icon includes instructing to perform an operation of replacing the second icon by the first icon if an initial position of the first icon is adjacent to an initial position of the second icon, or instructing to perform an operation of pushing away the second icon by the first icon if an initial position of the first icon is adjacent to an initial position of the second icon.

With reference to any one of the first implementation manner of the first aspect to the fifth implementation manner of the first aspect of the embodiments of the present disclosure, in a sixth implementation manner of the first aspect of the embodiments of the present disclosure, the instructing to perform a second operation on the first icon and the second icon when the distance between the first icon and the second icon falls within a second distance range, and that the first icon is in the staying state in the second distance range specifically includes instructing to perform the second operation on the first icon and the second icon when the distance between the first icon and the second icon falls within the second distance range, and duration in which the first icon is in the staying state is greater than a second preset time length when the distance between the first icon and the second icon falls within the second distance rang.

With reference to the sixth implementation manner of the first aspect of the embodiments of the present disclosure, in a seventh implementation manner of the first aspect of the embodiments of the present disclosure, the method further includes continuing to perform the detecting the duration in which the first icon is in the staying state when the distance between the first icon and the second icon falls within the second distance range, and duration in which the first icon is in the staying state is not greater than the second preset time length when the distance between the first icon and the second icon falls within the second distance range.

A second aspect of the embodiments of the present disclosure provides an icon control method, applied to a terminal that displays a first icon and a second icon, and the method includes detecting first input of a user, moving the first icon towards the second icon in response to the detected first input, instructing to perform a first operation on the first icon and the second icon when the first icon enters a first region of the second icon, and duration in which the first icon is in a staying state is greater than a third preset time length when the first icon entered the first region of the second icon, and/or instructing to perform a second operation on the first icon and the second icon when the first icon enters a second region of the second icon, and the first icon is in the staying state in the second region when the first icon entered a second region of the second icon, wherein a center point of the second icon falls within the second region, the second region and the first region do not overlap, and the second region is surrounded by the first region.

With reference to the second aspect of the embodiments of the present disclosure, in a first implementation manner of the second aspect of the embodiments of the present disclosure, after the detecting first input of a user, the method further includes detecting a position of the first icon relative to the first region and the second region of the second icon, detecting the duration in which the first icon is in the staying state, continuing to perform the detecting a position of the first icon relative to the first region and the second region of the second icon when the first icon does not yet enter the first region of the second icon, and continuing to perform the detecting the duration in which the first icon is in the staying state when the first icon enters the first region of the second icon, and duration in which the first icon is in the staying state is not greater than the third preset time length when the first icon entered the first region of the second icon.

With reference to the second aspect or the first implementation manner of the second aspect of the embodiments of the present disclosure, in a second implementation manner of the second aspect of the embodiments of the present disclosure, the second region is a circular region whose center is the center point of the second icon and whose radius is a third preset distance, the first region is a region within a circular region whose center is the center point of the second icon and whose radius is a fourth preset distance, excluding the second region, wherein the fourth preset distance is greater than the third preset distance, or the second region is a region within an inner square frame of the second icon, wherein a distance between each side of the inner square frame and the center point of the second icon is a fifth preset distance, the first region is a region within an outer square frame of the second icon, excluding the second region, wherein a distance between each side of the outer square frame and the center point of the second icon is a sixth preset distance, and the sixth preset distance is greater than the fifth preset distance.

With reference to any one of the second aspect to the second implementation manners of the second aspect of the embodiments of the present disclosure, in a third implementation manner of the second aspect of the embodiments of the present disclosure, after the moving the first icon towards the second icon, the method further includes displaying boundaries of the first region and the second region.

With reference to any one of the second aspect to the third implementation manners of the second aspect, in a fourth implementation manner of the second aspect of the embodiments of the present disclosure, the first operation is a replace operation or a push-away operation, and the second operation is a combine operation, or the first operation is a combine operation, and the second operation is a replace operation or a push-away operation.

With reference to the fourth implementation manner of the second aspect of the embodiments of the present disclosure, in a fifth implementation manner of the second aspect of the embodiments of the present disclosure, the instructing to perform a first operation on the first icon and the second icon includes instructing to perform an operation of replacing the second icon by the first icon if an initial position of the first icon is adjacent to an initial position of the second icon, or instructing to perform an operation of pushing away the second icon by the first icon if an initial position of the first icon is adjacent to an initial position of the second icon.

With reference to any one of the first implementation manner of the second aspect to the third implementation manner of the second aspect of the embodiments of the present disclosure, in a sixth implementation manner of the second aspect of the embodiments of the present disclosure, the instructing to perform a second operation on the first icon and the second icon when the first icon enters a second region of the second icon, and the first icon is in the staying state in the second region when the first icon entered a second region of the second icon specifically includes instructing to perform the second operation on the first icon and the second icon when the first icon enters the second region of the second icon, and duration in which the first icon is in the staying state is greater than a fourth preset time length when the first icon entered the second region of the second icon.

With reference to the sixth implementation manner of the second aspect of the embodiments of the present disclosure, in a seventh implementation manner of the second aspect of the embodiments of the present disclosure, the method further includes continuing to perform the detecting the duration in which the first icon is in the staying state when the first icon enters the second region of the second icon, and the duration in which the first icon is in the staying state is not greater than the fourth preset time length when the first icon entered the second region of the second icon.

A third aspect of the embodiments of the present disclosure provides a terminal, including a first display module, configured to display a first icon and a second icon, a first instructing module, configured to instruct to perform a first operation on the first icon and the second icon when a distance between the first icon and the second icon falls within a first distance range, and duration in which the first icon is in a staying state is greater than a first preset time length when the distance between the first icon and the second icon falls within the first distance range, wherein two endpoints of the first distance range are respectively a first preset distance and a second preset distance, and the second preset distance is less than the first preset distance, and/or a second instructing module, configured to instruct to perform a second operation on the first icon and the second icon when the distance between the first icon and the second icon falls within a second distance range, and the first icon is in the staying state in the second distance range, wherein two endpoints of the second distance range are respectively 0 and the second preset distance, the second preset distance is not less than 0, and the second operation is an operation different from the first operation.

With reference to the third aspect of the embodiments of the present disclosure, in a first implementation manner of the third aspect of the embodiments of the present disclosure, the terminal further includes a second detection module, configured to detect the distance between the first icon and the second icon, and a third detection module, configured to detect the duration in which the first icon is in the staying state, wherein the second detection module is further configured to detect the distance between the first icon and the second icon when the distance between the first icon and the second icon falls beyond the first distance range and the second distance range, and the third detection module is further configured to detect the duration in which the first icon is in the staying state when the distance between the first icon and the second icon falls within the first distance range, and duration in which the first icon is in the staying state is not greater than the first preset time length when the distance between the first icon and the second icon falls within the first distance range.

With reference to the third aspect or the first implementation manner of the third aspect of the embodiments of the present disclosure, in a second implementation manner of the third aspect of the embodiments of the present disclosure, the first display module is further configured to display an inner circular frame and an outer circular frame with a center at a center point of the second icon, where a radius of the inner circular frame is set to the second preset distance, and a radius of the outer circular frame is set to the first preset distance.

With reference to the first implementation manner of the third aspect or the second implementation manner of the third aspect of the embodiments of the present disclosure, in a third implementation manner of the third aspect of the embodiments of the present disclosure, the second instructing module is specifically configured to instruct to perform the second operation on the first icon and the second icon when the distance between the first icon and the second icon falls within the second distance range, and duration in which the first icon is in the staying state is greater than a second preset time length when the distance between the first icon and the second icon falls within the second distance range.

With reference to the third implementation manner of the third aspect of the embodiments of the present disclosure, in a fourth implementation manner of the third aspect of the embodiments of the present disclosure, the third detection module is further configured to detect the duration in which the first icon is in the staying state when the distance between the first icon and the second icon falls within the second distance range, and the duration in which the first icon is in the staying state is not greater than the second preset time length when the distance between the first icon and the second icon falls within the second distance range.

A fourth aspect of the embodiments of the present disclosure provides a terminal, including a second display module, configured to display a first icon and a second icon, a fourth detection module, configured to detect first input of a user, a second response module, configured to move the first icon towards the second icon in response to the first input detected by the fourth detection module, a third promoting module, configured to instruct to perform a first operation on the first icon and the second icon when the first icon enters a first region of the second icon, duration in which the first icon is in a staying state is greater than a third preset time length when the first icon enters a first region of the second icon, and/or a fourth instructing module, configured to instruct to perform a second operation on the first icon and the second icon when the first icon enters a second region of the second icon, and the first icon is in the staying state in the second region when the first icon entered a second region of the second icon, wherein a center point of the second icon falls within the second region, the second region and the first region do not overlap, and the second region is surrounded by the first region.

With reference to the fourth aspect of the embodiments of the present disclosure, in a first implementation manner of the fourth aspect of the embodiments of the present disclosure, the terminal further includes a fifth detection module, configured to detect a position of the first icon relative to the first region and the second region of the second icon, and a sixth detection module, configured to detect the duration in which the first icon is in the staying state, wherein the fifth detection module is further configured to detect the position of the first icon relative to the first region and the second region of the second icon when the first icon does not yet enter the first region of the second icon, and the sixth detection module is further configured to detect the duration in which the first icon is in the staying state when the first icon enters the first region of the second icon, and duration in which the first icon is in the staying state is not greater than the third preset time length when the first icon entered the first region of the second icon.

With reference to the first implementation manner or the second implementation manner of the fourth aspect of the embodiments of the present disclosure, in a third implementation manner of the fourth aspect of the embodiments of the present disclosure, the second display module is further configured to display boundaries of the first region and the second region.

With reference to the second implementation manner or the third implementation manner of the fourth aspect of the embodiments of the present disclosure, in a fourth implementation manner of the fourth aspect of the embodiments of the present disclosure, the fourth instructing module is specifically configured to instruct to perform the second operation on the first icon and the second icon when the first icon enters the second region of the second icon, and duration in which the first icon is in the staying state is greater than a fourth preset time length when the first icon entered the second region of the second icon.

With reference to the fourth implementation manner of the fourth aspect of the embodiments of the present disclosure, in a fifth implementation manner of the fourth aspect of the embodiments of the present disclosure, the sixth detection module is further configured to detect the duration in which the first icon is in the staying state when the first icon enters the second region of the second icon, and duration in which the first icon is in the staying state is not greater than the fourth preset time length when the first icon enters the second region of the second icon.

It can be learned from the foregoing technical solutions that, the embodiments of the present disclosure have the following advantages. When a distance between a first icon and a second icon falls within a first distance range, and the first icon is in a staying state, before instructing to perform a first operation, a terminal further needs to determine that in the first distance range, duration in which the first icon is in the staying state is greater than a first preset time length. In this way, if a second operation needs to be performed on the first icon and the second icon, when the first icon passes the first distance range in a process of approaching the second icon, it is determined whether the duration in which the first icon is in the staying state is greater than the first preset time length. If the duration is not greater than the first preset time length, it indicates that the first operation does not need to be performed on the first icon and the second icon, and the terminal avoids an incorrect operation of instructing to perform the first operation simply because the first icon momentarily enters the staying state. Therefore, a probability that the terminal falsely responds is greatly reduced, and without affecting a user's original operation habit, an interaction capability of the terminal is improved.

DESCRIPTION OF EMBODIMENTS

Figure 1:
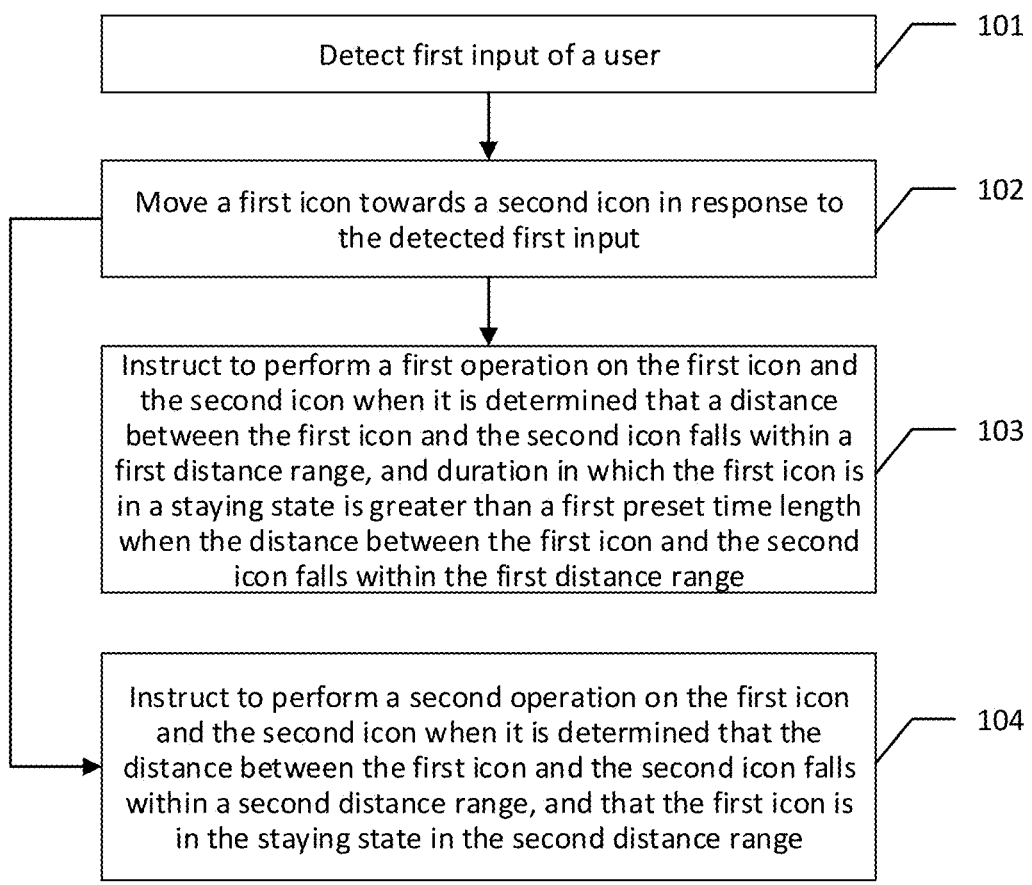
FIG. 1 is a schematic flowchart of an icon control method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

It should be understood that although terms "first" and "second" are used in the embodiments of the present disclosure to describe various icons or operations, the icons or the operations should not be limited by these terms. These terms are merely used to differentiate the icons or the operations from each other. For example, without departing from the scope of the embodiments of the present disclosure, a first icon may also be referred to as a second icon; similarly, a second icon may also be referred to as a first icon; similarly, a second operation may also be referred to as a third operation, and so on, which is not limited in the embodiments of the present disclosure.

The terms used herein in descriptions of the present disclosure are for the purpose of describing specific embodiments, and are not intended to limit the present disclosure.

The term "first input" indicates information received by a terminal and used for a user controlling an icon. Specifically, the first input has many representation forms according to different input manners supported by the terminal. For example, if the input manner supported by the terminal is touch detection, the first input may include a touch and subsequent movement of a finger on the terminal (for example, a touchscreen), a touch and subsequent movement of a stylus on the terminal (for example, a touchscreen), a touch and subsequent movement of another object on the terminal (for example, a touchscreen), or the like. If the input manner supported by the terminal further includes a floating touch, the first input may be a movement track or the like of an object above the terminal. The first input may further have many other representation forms; for example, the user selects and drags an icon with a mouse, an operating lever, or the like, which is not specifically limited herein.

The term "distance between a first icon and a second icon" may specifically have many representation manners, for example, may be a distance between a center point of the first icon and a center point of the second icon, a distance between the leftmost of the first icon and the leftmost of the second icon, or a distance between a lower right corner of the first icon and a lower right corner of the second icon, which is not limited herein.

The term "staying state" is used to indicate that a movement speed of an icon is less than a preset speed threshold.

The terms "first operation" and "second operation" both indicate an operation that can be performed on an icon by a terminal. The first operation is different from the second operation, and specifically which operation the first operation or the second operation is may depend on various cases, for example, may be set at delivery of the terminal, or may be specified by a developer or a programmer of an operating system, or even may be set by a user, which is not limited herein. For example, the first operation may be a replace operation or a push-away operation, and the second operation may be a combine operation. The replace operation is exchanging positions of icons. The push-away operation includes vacating a position of a second icon, and forcing the second icon and a following icon or an icon directly below the second icon one grid further or directly downwards, so that a first icon occupies the position vacated by the second icon. The combine operation is creating an icon folder, and putting both the first icon and the second icon into the icon folder. Alternatively, the first operation may be automatically starting a second application program (or a second file) corresponding to the second icon, and automatically presenting, in the second application program, a first application program (or a Uniform Resource Locator (URL) of the first application program or a first file or a URL of the first file) corresponding to the first icon, or using the first application program corresponding to the first icon as content to be shared by the second application program (or the second file); the second operation may be deleting the second icon, so that the first icon occupies a position vacated by the second icon. Alternatively, the first operation and the second operation may be exchanged, for example, the first operation is the combine operation, and the second operation is the replace operation or the push-away operation. It may be understood that the first operation or the second operation may further be another operation that can be performed on an icon by a terminal, which is not limited herein.

The term "initial position of a first icon" indicates a position of the first icon in a user interface when or before a terminal receives first input. The term "initial position of a second icon" indicates a position of the second icon in a user interface when or before a terminal receives first input.

The term "first distance range", whose two endpoints are respectively a first preset distance and a second preset distance, may be mathematically expressed as (the second preset distance, the first preset distance) or [the second preset distance, the first preset distance], where the second preset distance is less than the first preset distance. The following uses the open range as an example for description. When a distance between a first icon and a second icon falls within this range (the second preset distance, the first preset distance), it indicates that the distance between the first icon and the second icon falls within the first distance range. Both the first preset distance and the second preset distance are preset distance values. The first icon is farther from the second icon when the distance between the first icon and the second icon is the first preset distance than when the distance between the first icon and the second icon is the second preset distance. During the second icon is moved towards the first icon from a distance, the distance between the two icons first reaches the first preset distance, and then reaches the second preset distance.

It may be understood that the first preset distance and the second preset distance are set in many manners, and may be set according to an actual requirement. For example, the first preset distance may be set to a side length of a grid in which an icon is located, and the second preset distance may be set to a side length of the icon; or the first preset distance may be set shorter, and the second preset distance may be set to three quarters of the icon side length; or the like. There may further be more setting manners, which are not limited herein.

The term "second distance range", whose two endpoints are respectively 0 and a second preset distance, may be mathematically expressed as (0, the second preset distance) or [0, the second preset distance], where the second preset distance is not less than 0. The following uses the open range as an example for description. When a distance between a first icon and a second icon falls within this range (0, the second preset distance), it indicates that the distance between the first icon and the second icon falls within the second distance range.

The embodiments of the present disclosure is executed by a terminal, where the terminal may be a mobile terminal that includes but is not limited to a mobile phone, a mobile computer, a tablet computer, and a personal digital assistant (PDA), or may be a fixed terminal, for example, a media player, a personal computer, or a smart television, which is not limited herein.

Solutions in the embodiments of the present disclosure generally apply when a terminal is in an icon editing state. The icon editing state indicates that an icon in a user interface of the terminal is editable, and there are many manners of triggering the icon editing state. For example, it may be set that entering the icon editing state is triggered once a finger of a user touches and holds an icon in the user interface over a preset time length, or it may be set that entering the icon editing state is triggered after a function on the terminal is executed, or it may be set that entering the icon editing state is triggered after a key on the terminal is touched and held. A specific triggering manner is not limited herein.

Referring to FIG. 1, an embodiment of an icon control method in an embodiment of the present disclosure includes the following steps.

101. Detect first input of a user.

When in an icon editing state, a terminal detects the first input of the user, where the terminal displays a first icon and a second icon, and the first icon and the second icon are two different icons.

102. Move a first icon towards a second icon in response to the detected first input.

After detecting the first input, the terminal moves the first icon towards the second icon in response to the detected first input.

103. Instruct to perform a first operation on the first icon and the second icon when a distance between the first icon and the second icon falls within a first distance range, and that in the first distance range, duration in which the first icon is in a staying state is greater than a first preset time length.

In a process of moving the first icon towards the second icon, the terminal instructs to perform the first operation on the first icon and the second icon when the distance between the first icon and the second icon falls within the first distance range, and that in the first distance range, the duration in which the first icon is in the staying state is greater than the first preset time length, where two endpoints of the first distance range are respectively a first preset distance and a second preset distance, and the second preset distance is less than the first preset distance.

That in the first distance range, the duration in which the first icon is in the staying state is greater than the first preset time length specifically indicates that in a case in which the distance between the first icon and the second icon falls within the first distance range, the duration in which the first icon is in the staying state is greater than the first preset time length.

It may be understood that "the distance between the first icon and the second icon falls within the first distance range" and "in the first distance range, the duration in which the first icon is in the staying state is greater than the first preset time length" are two coordinating conditions, and the terminal instructs to perform the first operation on the first icon and the second icon only when both the two conditions are satisfied. If one of the two conditions is satisfied and the other condition is not satisfied, neither the first operation nor the second operation is performed.

It should be noted that, when instructing to perform the first operation on the first icon and the second icon, the terminal does not yet perform the first operation, but only displays an animated effect of performing the first operation. Then, there may be two cases. In a first case, the terminal receives a confirmation operation of the user, for example, dropping the icon, and at this moment, the terminal really performs the first operation. In a second case, the terminal receives a cancellation operation of the user, for example, receives input of the user continuing to move the first icon, and at this moment, the terminal continues to move the first icon in response to the input of the user, and does not perform the first operation.

104. Instruct to perform a second operation on the first icon and the second icon when the distance between the first icon and the second icon falls within a second distance range, and that the first icon is in the staying state in the second distance range.

In the process of moving the first icon towards the second icon, the terminal instructs to perform the second operation on the first icon and the second icon when the distance between the first icon and the second icon falls within the second distance range, and that the first icon is in the staying state in the second distance range, where two endpoints of the second distance range are respectively 0 and the second preset distance, the second preset distance is not less than 0, and the second operation is an operation different from the first operation.

That the first icon is in the staying state in the second distance range specifically indicates that the first icon is in the staying state in a case in which the distance between the first icon and the second icon falls within the second distance range.

It should be noted that, when instructing to perform the second operation on the first icon and the second icon, the terminal does not yet perform the second operation, but only displays an animated effect of performing the second operation. Then, there may be two cases. In a first case, the terminal receives a confirmation operation of the user, for example, dropping the icon, and at this moment, the terminal really performs the second operation. In a second case, the terminal receives a cancellation operation of the user, for example, receives input of the user continuing to move the first icon, and at this moment, the terminal continues to move the first icon in response to the input of the user, and does not perform the second operation.

In this embodiment of the present disclosure, when a distance between a first icon and a second icon falls within a first distance range, and the first icon is in a staying state, before instructing to perform the first operation, a terminal further needs to determine that in the first distance range, duration in which the first icon is in the staying state is greater than a first preset time length. In this way, if a second operation needs to be performed on the first icon and the second icon, when the first icon passes the first distance range in a process of approaching the second icon, it is determined whether the duration in which the first icon is in the staying state is greater than the first preset time length. If the duration is not greater than the first preset time length, it indicates that the first operation does not need to be performed on the first icon and the second icon, and the terminal avoids an incorrect operation of instructing to perform the first operation simply because the first icon momentarily enters the staying state. Therefore, a probability that the terminal falsely responds is greatly reduced, and without affecting a user's original operation habit, an interaction capability of the terminal is improved.

Figure 2:
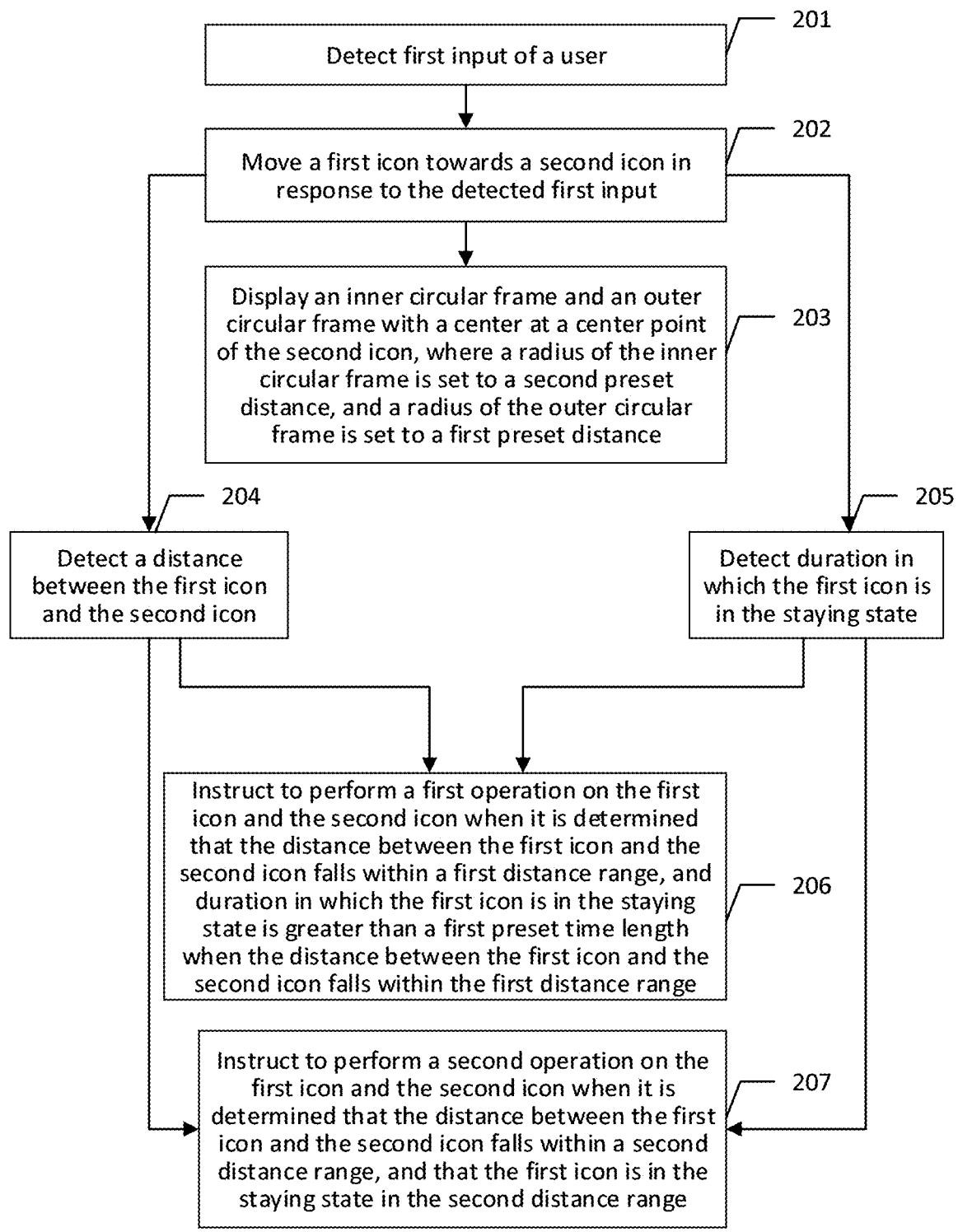
FIG. 2 is another schematic flowchart of an icon control method according to an embodiment of the present disclosure.

The following describes in detail an icon control method in an embodiment of the present disclosure. Referring to FIG. 2, another embodiment of the icon control method in this embodiment of the present disclosure includes the following steps.

201. Detect first input of a user.

When in an icon editing state, a terminal detects the first input of the user, where the terminal displays a first icon and a second icon, and the first icon and the second icon are two different icons.

202. Move the first icon towards the second icon in response to the detected first input.

After detecting the first input, the terminal moves the first icon towards the second icon in response to the detected first input.

It may be understood that, there may be many icons in a user interface of the terminal, and the terminal moves the first icon towards the second icon according to the first input. The second icon is a target icon of the user. The terminal may determine the second icon, that is, the target icon of the user, according to information in the first input, such as a direction in which or a speed at which the user moves the first icon. For example, the user touches and holds to move the first icon in a direction, and any one of icons (for example, three possible icons A, B, and C in order from near to far) in the direction may be the second icon. The terminal further detects a speed at which the first icon is moved. If the first icon passes the icon A at a speed that exceeds a first preset speed value, the icon A is not the second icon. If a speed value of the first icon decreases to below a second preset speed value when almost reaching the icon B, the icon B is the target icon of the user, that is, the second icon. According to an operation indicated by the first input and performed on the first icon by the user, there may further be many manners of determining the second icon, which are not limited herein.

203. Display an inner circular frame and an outer circular frame with a center at a center point of the second icon, where a radius of the inner circular frame is set to a second preset distance, and a radius of the outer circular frame is set to a first preset distance.

In a process of moving the first icon towards the second icon, the terminal may display the inner circular frame and the outer circular frame with the center at the center point of the second icon. The radius of the inner circular frame is set to the second preset distance, the radius of the outer circular frame is set to the first preset distance, and the first preset distance is greater than the second preset distance.

It may be understood that, once a center point of the first icon enters a range of the outer circular frame, it indicates that a distance between the first icon and the second icon is less than the first preset distance. Likewise, once the center point of the first icon enters a range of the inner circular frame, it indicates that the distance between the first icon and the second icon is less than the second preset distance.

It may be understood that, displaying the inner circular frame and the outer circular frame is merely a user-friendly displaying manner of the user interface, which makes the user clearly know ranges of the first preset distance and the second preset distance that are set by the terminal. Actually, whether to instruct to perform a first operation or a second operation still depends on the distance between the first icon and the second icon and duration in which the first icon is in a staying state.

It may be understood that, in actual application, step 203 may either not be executed in some cases according to an actual requirement; in some other cases, not only the inner circular frame and the outer circular frame may be displayed outside the second icon, but also the inner circular frame and the outer circular frame may be displayed outside all icons except the first icon in the user interface, which is not limited herein.

204. Detect a distance between the first icon and the second icon.

In the process of moving the first icon towards the second icon, the terminal detects the distance between the first icon and the second icon, to compare the distance with the first preset distance and the second preset distance.

It may be understood that, in this embodiment, the distance between the first icon and the second icon may be a distance between the center point of the first icon and the center point of the second icon.

205. Detect duration in which the first icon is in a staying state.

In the process of moving the first icon towards the second icon, the terminal may detect the duration in which the first icon is in the staying state, to compare the duration with a first preset time length.

It should be noted that, a condition for determining the staying state is that a movement speed of the first icon is less than a preset speed threshold, that is, the first icon is in the staying state provided that the movement speed of the first icon is less than the preset speed threshold. Regardless of whether the first icon stays still at a point (a speed value is 0) or is in a moving state, the first icon keeps in the staying state provided that the movement speed of the first icon does not exceed the preset speed threshold in a process of moving within a range of distance or a region, and duration of the staying state can be accumulated.

It may be understood that, after the distance between the first icon and the second icon is detected in step 204, it is determined whether a condition that "the distance between the first icon and the second icon falls within a first distance range" is satisfied; after the duration in which the first icon is in the staying state is detected in step 205, it is determined whether a condition that "in the first distance range, the duration in which the first icon is in the staying state is greater than the first preset time length" is satisfied. The terminal instructs to perform the first operation on the first icon and the second icon only when both the two conditions are satisfied. Determining for the two conditions may be performed in various sequences.

Solution 1: First executing only step 204, and then executing step 205 after the condition is satisfied.

1. Step 204: Detect a distance between the first icon and the second icon is executed.

2. In the process of moving the first icon towards the second icon, when the distance between the first icon and the second icon falls beyond the first distance range and a second distance range, it indicates that the distance between the first icon and the second icon does not reach the first preset distance, and in this case, the terminal may continue to execute step 204: Detect a distance between the first icon and the second icon.

3. The first icon continues to approach the second icon, and when determining that the distance between the first icon and the second icon falls within the first distance range, the terminal starts to execute step 205: Detect duration in which the first icon is in the staying state. It may be understood that, step 204 is still executed at the same time after step 205 starts to be executed.

4. When determining that the distance between the first icon and the second icon falls within the first distance range, and that the duration in which the first icon is in the staying state is not greater than the first preset time length, the terminal may continue to execute step 205: Detect duration in which the first icon is in the staying state.

In the first distance range, the duration in which the first icon is in the staying state may have two cases. In a first case, in the first distance range, the duration in which the first icon is in the staying state is greater than the first preset time length. In a second case, the first icon continues to approach the second icon until the distance between the first icon and the second icon leaves the first distance range and enters the second distance range, and the duration in which the first icon is in the staying state is not greater than the first preset time length from the beginning to the end in the first distance range.

5. The terminal executes step 206 when determining that the distance between the first icon and the second icon falls within the first distance range, and that the duration in which the first icon is in the staying state is greater than the first preset time length.

6. The first icon continues to approach the second icon, and the terminal executes step 207 when determining that the distance between the first icon and the second icon falls within the second distance range, and that the first icon is in the staying state.

Optionally, when the distance between the first icon and the second icon falls within the second distance range, it may be set that step 207 is executed only when the duration in which the first icon is in the staying state is greater than a second preset time length. Therefore, step 205 continues to be executed when the distance between the first icon and the second icon falls within the second distance range, and that the duration in which the first icon is in the staying state is not greater than the second preset time length; or step 207 is executed when the distance between the first icon and the second icon falls within the second distance range, and that in the second distance range, the duration in which the first icon is in the staying state is greater than the second preset time length.

Solution 2: First executing only step 205, and then executing step 204 after the condition is satisfied.

1. Step 205: Detect duration in which the first icon is in the staying state is executed.

2. Step 205 continues to be executed when the duration in which the first icon is in the staying state is not greater than the first preset time length.

3. When the duration in which the first icon is in the staying state is greater than the first preset time length, step 204: Detect a distance between the first icon and the second icon starts to be executed. It may be understood that, step 205 is executed at the same time.

In this case, the detected distance between the first icon and the second icon may have the following several cases.

In a first case, the distance between the first icon and the second icon is still beyond the first distance range and a second distance range, and in this case, the terminal may continue to execute step 204: Detect a distance between the first icon and the second icon. Because both step 204 and step 205 have been executed at the same time, for a subsequent execution process, refer to the execution process in Solution 1, and details are not described herein.

In a second case, the distance between the first icon and the second icon falls within the first distance range, the terminal removes, from recorded duration of the staying state, duration of the staying state recorded beyond the first distance range, cuts out duration in which the first icon is in the staying state when the distance between the first icon and the second icon falls within the first distance range, and determines whether the duration is greater than the first preset time length. If the duration is greater than the first preset time length, step 206 is executed, or if the duration is not greater than the first preset time length, step 205: Detect duration in which the first icon is in the staying state continues to be executed. Because both step 204 and step 205 have been executed at the same time, for a subsequent execution process, refer to the execution process in Solution 1, and details are not described herein.

In a third case, the distance between the first icon and the second icon falls within a second distance range, and step 207 is executed.

Optionally, when the distance between the first icon and the second icon falls within the second distance range, it may be set that step 207 is executed only when the duration in which the first icon is in the staying state is greater than a second preset time length. Therefore, when determining that the distance between the first icon and the second icon falls within the second distance range, the terminal removes, from recorded duration of the staying state, duration of the staying state recorded beyond the second distance range, cuts out duration in which the first icon is in the staying state when the distance between the first icon and the second icon falls within the second distance range, and determines whether the duration is greater than the second preset time length. Step 205 continues to be executed when the distance between the first icon and the second icon falls within the second distance range, and that in the second distance range, the duration in which the first icon is in the staying state is not greater than the second preset time length, or step 207 is executed when the distance between the first icon and the second icon falls within the second distance range, and that in the second distance range, the duration in which the first icon is in the staying state is greater than the second preset time length.

Solution 3: Executing step 204 and step 205 at the same time.

1. Step 204 and step 205 are executed.
2. In the process of moving the first icon towards the second icon, when the distance between the first icon and the second icon falls beyond the first distance range and a second distance range, it indicates that the distance between the first icon and the second icon does not reach the first preset distance, and in this case, the terminal may continue to execute step 204 and step 205.
3. The terminal may continue to execute step 204 and step 205 when determining that the distance between the first icon and the second icon falls within the first distance range, and that the duration in which the first icon is in the staying state is not greater than the first preset time length.

In the first distance range, the duration in which the first icon is in the staying state may have two cases. In a first case, in the first distance range, the duration in which the first icon is in the staying state is greater than the first preset time length. In a second case, the first icon continues to approach the second icon until the distance between the first icon and the second icon leaves the first distance range and enters the second distance range, and the duration in which the first icon is in the staying state is not greater than the first preset time length from the beginning to the end in the first distance range.

4. The terminal executes step 206 when determining that the distance between the first icon and the second icon falls within the first distance range, and that the duration in which the first icon is in the staying state is greater than the first preset time length.

5. The first icon continues to approach the second icon, and the terminal executes step 207 when determining that the distance between the first icon and the second icon falls within the second distance range, and that the first icon is in the staying state.

Optionally, when the distance between the first icon and the second icon falls within the second distance range, it may be set that step 207 is executed only when the duration in which the first icon is in the staying state is greater than a second preset time length. Therefore, step 204 and step 205 continue to be executed when the distance between the first icon and the second icon falls within the second distance range, and that the duration in which the first icon is in the staying state is not greater than the second preset time length, or step 207 is executed when the distance between the first icon and the second icon falls within the second distance range, and that in the second distance range, the duration in which the first icon is in the staying state is greater than the second preset time length.

It may be understood that, in the process of moving the first icon towards the second icon, the terminal further displays at the same time animation of moving the first icon towards the second icon.

206. Instruct to perform a first operation on the first icon and the second icon.

The terminal instructs to perform the first operation on the first icon and the second icon when the distance between the first icon and the second icon falls within the first distance range, and that in the first distance range, the duration in which the first icon is in the staying state is greater than the first preset time length, where two endpoints of the first distance range are respectively the first preset distance and the second preset distance, and the second preset distance is less than the first preset distance.

It should be noted that, when instructing to perform the first operation on the first icon and the second icon, the terminal does not yet perform the first operation, but only displays an animated effect of performing the first operation. Then, there may be two cases. In a first case, the terminal receives a confirmation operation of the user, for example, dropping the icon, and at this moment, the terminal really performs the first operation. In a second case, the terminal receives a cancellation operation of the user, for example, receives input of the user continuing to move the first icon, and at this moment, the terminal continues to move the first icon in response to the input of the user, and does not perform the first operation.

207. Instruct to perform a second operation on the first icon and the second icon.

The terminal instructs to perform the second operation on the first icon and the second icon when the distance between the first icon and the second icon falls within the second distance range, and that the first icon is in the staying state in the second distance range.

Optionally, the terminal instructs to perform the second operation on the first icon and the second icon when the distance between the first icon and the second icon falls within the second distance range, and that in the second distance range, the duration in which the first icon is in the staying state is greater than the second preset time length.

It should be noted that, when instructing to perform the second operation on the first icon and the second icon, the terminal does not yet perform the second operation, but only displays an animated effect of performing the second operation. Then, there may be two cases. In a first case, the terminal receives a confirmation operation of the user, for example, dropping the icon, and at this moment, the terminal really performs the second operation. In a second case, the terminal receives a cancellation operation of the user, for example, receives input of the user continuing to move the first icon, and at this moment, the terminal continues to move the first icon in response to the input of the user, and does not perform the second operation.

Optionally, the first operation may be a replace operation or a push-away operation, and the second operation may be a combine operation. The instructing to perform a first operation on the first icon and the second icon may specifically include, if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

Optionally, the first operation is a combine operation, and second operation is a replace operation or a push-away operation. The instructing to perform a second operation on the first icon and the second icon may specifically include, if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

In this embodiment of the present disclosure, a distance between center points of a first icon and a second icon is used as a distance between the first icon and the second icon, and the distance is used as a boundary for determining an operation, in addition, duration in which the first icon is in a staying state is determined, which jointly determine whether to instruct to perform a first operation or a second operation. Therefore, a probability that a terminal falsely responds is reduced, and an interaction capability of the terminal is improved.

For ease of understanding, the following uses a specific application scenario to describe in detail the icon control method in this embodiment of the present disclosure.

Figure 3A:
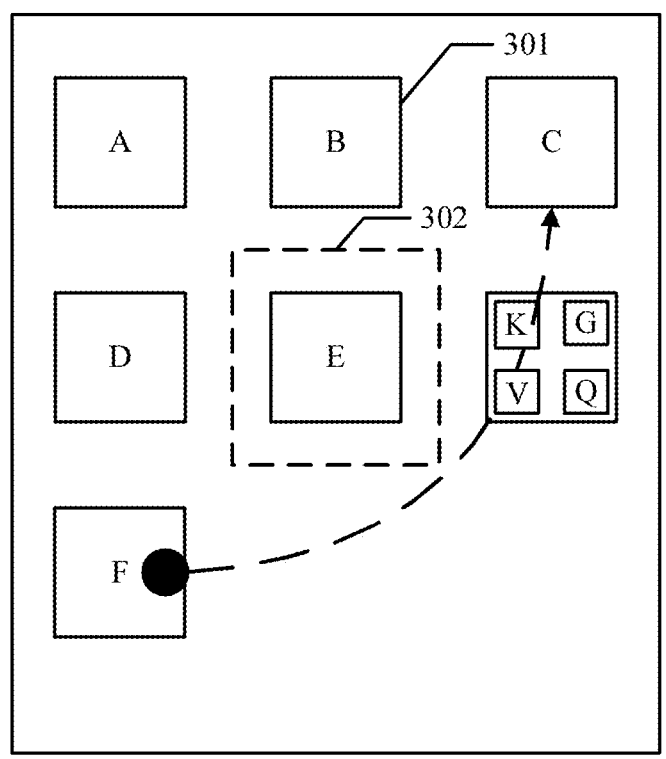
FIGS. 3A, 3B, 3C, 3D, and 3E are schematic diagrams of an instance of an icon control method according to an embodiment of the present disclosure.
Figure 3B:
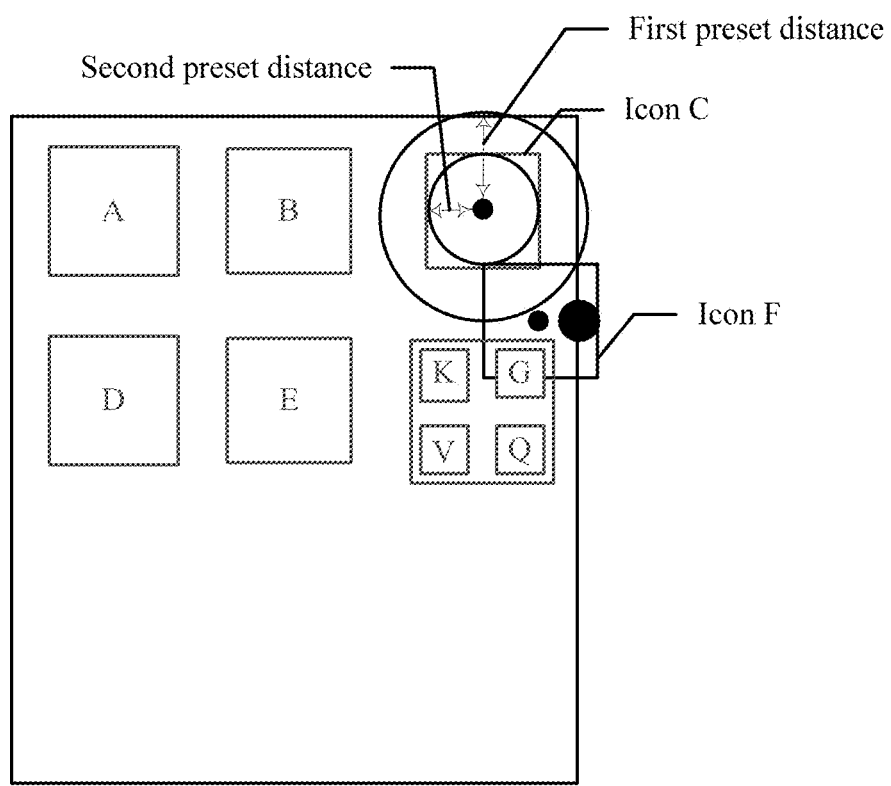
Figure 3C:
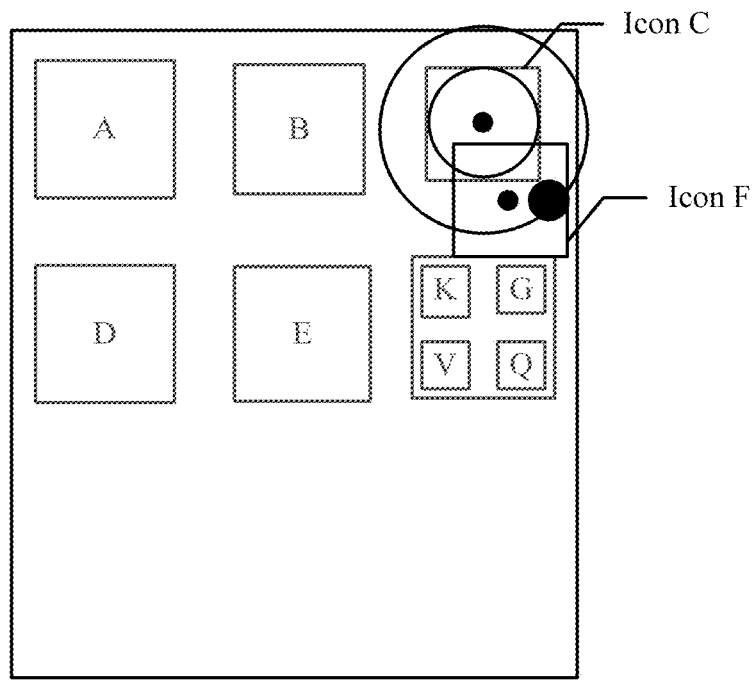
Figure 3D:
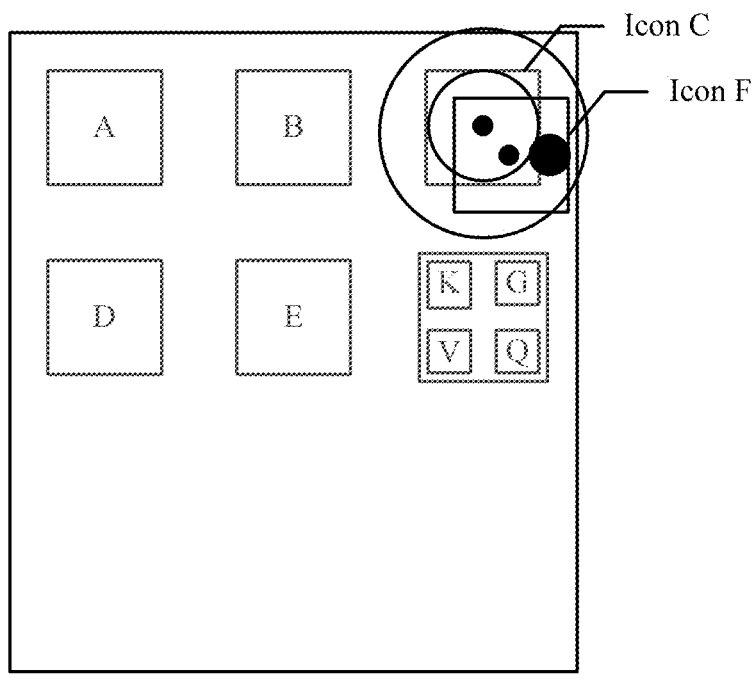

FIG. 3A shows a user interface of a terminal, and there are seven icons in the user interface, which are icons of application programs A, B, C, D, E, and F and a folder icon G. A solid line box (as shown by 301) outside each icon represents a size of the icon, and a dashed line box (as shown by 302) outside an icon represents a size of a grid occupied by the icon in the user interface. A small black dot in FIGS. 3B, 3C, and 3D represents a center point of an icon, and a big black dot in FIGS. 3A, 3B, 3C, and 3D represents a position touched and held by a user.

A first operation is set to a push-away operation, and a second operation is set to a combine operation.

A finger of the user touches and holds the icon F for a period of time to enter an icon editing state, and in the icon editing state, the terminal detects input of the user: touching and holding to move the icon F towards the icon C.

In response to the input of the user, the terminal controls the icon F to move towards the icon C, and determines the icon F as a first icon.

In a process of moving towards the icon C, the icon F passes the icon G at a speed whose value exceeds a first preset speed, and the terminal determines that the folder icon G is not a second icon.

After the icon F passes the folder icon G, the speed reduces to less than a second preset speed, and the terminal determines that a next icon in this movement direction is a target icon of user, that is, determines that the icon C is the second icon.

As shown in FIG. 3B, the terminal displays an outer circular frame by using a center point of the icon C as a center and using 0.7 times of a side length (a first preset distance) of a grid in which the icon is located as a radius, and displays an inner circular frame by using 0.3 times of the side length (a second preset distance) of the grid in which the icon is located as a radius, so that the user can clearly determine a distance.

The icon F continues to approach the icon C. The terminal keeps calculating a distance between the center points of the icon C and the icon F, and compares the distance with the first preset distance and the second preset distance.

At the same time, the terminal detects whether the speed value of the icon F is less than a preset speed threshold, and if the speed value is less than the preset speed threshold, determines that a staying state appears. If the staying state appears, the terminal detects duration of the staying state, and compares the duration with a first preset time length.

As shown in FIG. 3C, the distance between the center point of the icon F and the center point of the icon C is less than the first preset distance and is greater than the second preset distance, and in this case, the center point of the icon F is located between the inner circular frame and the outer circular frame. Although the terminal detects that the icon F occasionally enters the staying state, the terminal does not instruct to perform the push-away operation on the icon C and the icon F because duration in which the staying state appears each time does not reach the first preset time length.

Figure 3E:
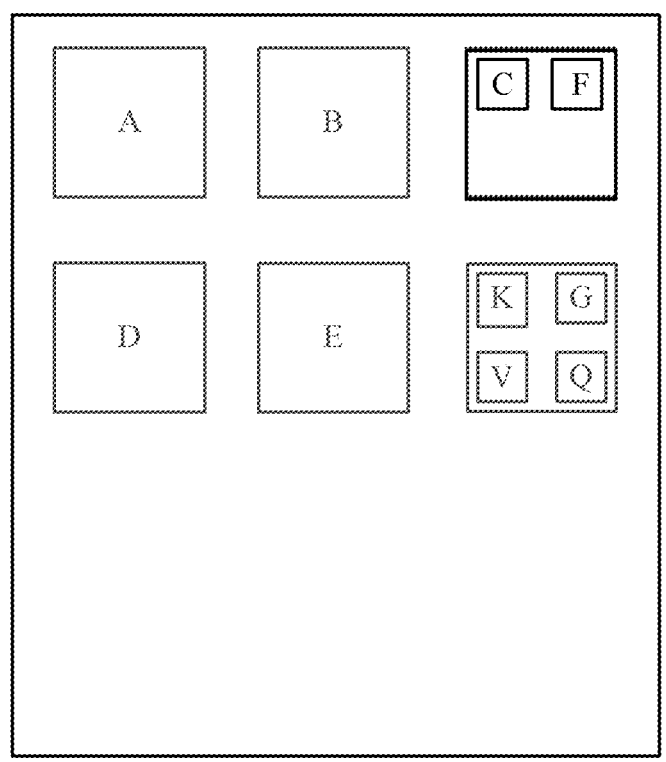

As shown in FIG. 3D, the distance between the center point of the icon F and the center point of the icon C is less than the second preset distance, and in this case, the center point of the icon F is in the inner circular frame. The terminal detects that the icon F enters the staying state, instructs to perform the combine operation on the icon C and the icon F, and displays an animated effect of the icon C and the icon F being combined into one folder icon, as shown in FIG. 3E.

When receiving input of the user withdrawing the finger, the terminal performs the combine operation on the icon C and the icon F, to combine the icon C and the icon F into one folder icon.

Figure 4:
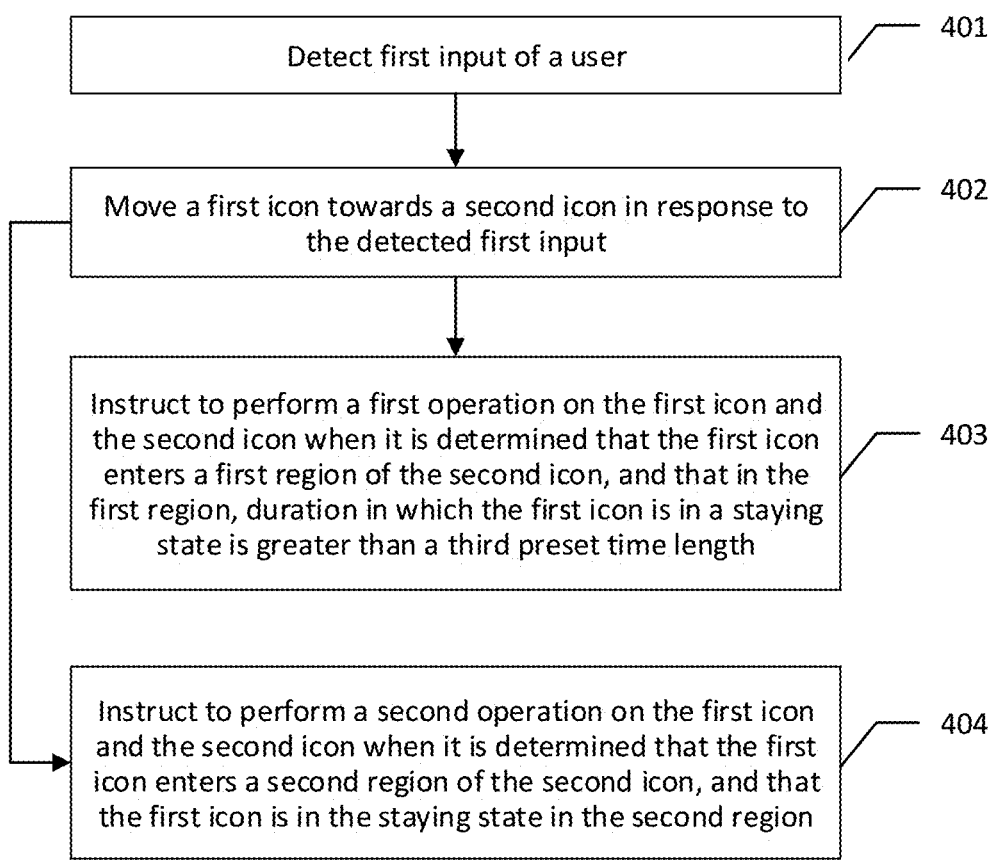
FIG. 4 is another schematic flowchart of an icon control method according to an embodiment of the present disclosure.

In the foregoing embodiment, a distance between a first icon and a second icon is used as a condition for determining whether to perform an operation. In actual application, whether the first icon enters a region of the second icon may also be used as a condition for determining whether to perform an operation. Referring to FIG. 4, another embodiment of an icon control method in an embodiment of the present disclosure includes the following steps.

401. Detect first input of a user.

When in an icon editing state, a terminal detects the first input of the user, where the terminal displays a first icon and a second icon, and the first icon and the second icon are two different icons.

402. Move the first icon towards the second icon in response to the detected first input.

After detecting the first input, the terminal moves the first icon towards the second icon in response to the detected first input.

403. Instruct to perform a first operation on the first icon and the second icon when the first icon enters a first region of the second icon, and that in the first region, duration in which the first icon is in a staying state is greater than a third preset time length.

In a process of moving the first icon towards the second icon, the terminal instructs to perform the first operation on the first icon and the second icon when the first icon enters the first region of the second icon, and that in the first region, the duration in which the first icon is in the staying state is greater than the third preset time length.

It should be noted that, when instructing to perform the first operation on the first icon and the second icon, the terminal does not yet perform the first operation, but only displays an animated effect of performing the first operation. Then, there may be two cases. In a first case, the terminal receives a confirmation operation of the user, for example, dropping the icon, and at this moment, the terminal really performs the first operation. In a second case, the terminal receives a cancellation operation of the user, for example, receives input of the user continuing to move the first icon, and at this moment, the terminal continues to move the first icon in response to the input of the user, and does not perform the first operation.

It may be understood that, the first icon is displayed in the user interface as a two-dimensional graph that includes many points and whose area is not 0, and the first region of the second icon is also a two-dimensional graph whose area is not 0. It may be set that, when any point on the first icon enters the first region of the second icon, the first icon enters the first region of the second icon. Alternatively, it may be set that, only when a part of the first icon enters the first region of the second icon, the first icon enters the first region of the second icon. A proportion of this part in the first icon may be set according to a requirement. For example, it may be set that, once an eighth of the area of the first icon enters the first region of the second icon, the first icon enters the first region of the second icon, or another proportion may be set, which is not limited herein.

404. Instruct to perform a second operation on the first icon and the second icon when the first icon enters a second region of the second icon, and that the first icon is in the staying state in the second region.

In the process of moving the first icon towards the second icon, the terminal instructs to perform the second operation on the first icon and the second icon when the first icon enters the second region of the second icon, and that the first icon is in the staying state in the second region, where a center point of the second icon falls within the second region, the second region and the first region do not overlap, and the second region is surrounded by the first region.

It should be noted that, when instructing to perform the second operation on the first icon and the second icon, the terminal does not yet perform the second operation, but only displays an animated effect of performing the second operation. Then, there may be two cases. In a first case, the terminal receives a confirmation operation of the user, for example, dropping the icon, and at this moment, the terminal really performs the second operation. In a second case, the terminal receives a cancellation operation of the user, for example, receives input of the user continuing to move the first icon, and at this moment, the terminal continues to move the first icon in response to the input of the user, and does not perform the second operation.

It may be understood that, similar to the manners of determining that the first icon enters the first region of the second icon, there may also be many manners of determining that the first icon enters the second region of the second icon, which are not limited herein.

It may be understood that, the first icon needs to enter the first region of the second icon before entering the second region of the second icon. Therefore, once the first icon enters the second region of the second icon, a condition for determining whether to perform the first operation is no longer determined, for example, whether the first icon is located in the first region of the second icon, and whether the first icon is in the staying state in the first region, but instead, only a condition for determining whether to perform the second operation is determined, for example, whether the first icon is in the staying state in the second region.

In this embodiment of the present disclosure, a terminal does not immediately instruct to perform a first operation when a first icon enters a first region of a second icon and is in a staying state, but instructs to perform the first operation only after duration in which the first icon is in the staying state is greater than a third preset time length. In this way, if a second operation needs to be performed on the first icon and the second icon, when the first icon passes the first region of the second icon in a process of approaching the second icon, the terminal avoids an incorrect operation of instructing to perform the first operation simply because the first icon momentarily enters the staying state. Therefore, a probability that the terminal falsely responds is greatly reduced, and without affecting a user's original operation habit, an interaction capability of the terminal is improved.

Figure 5:
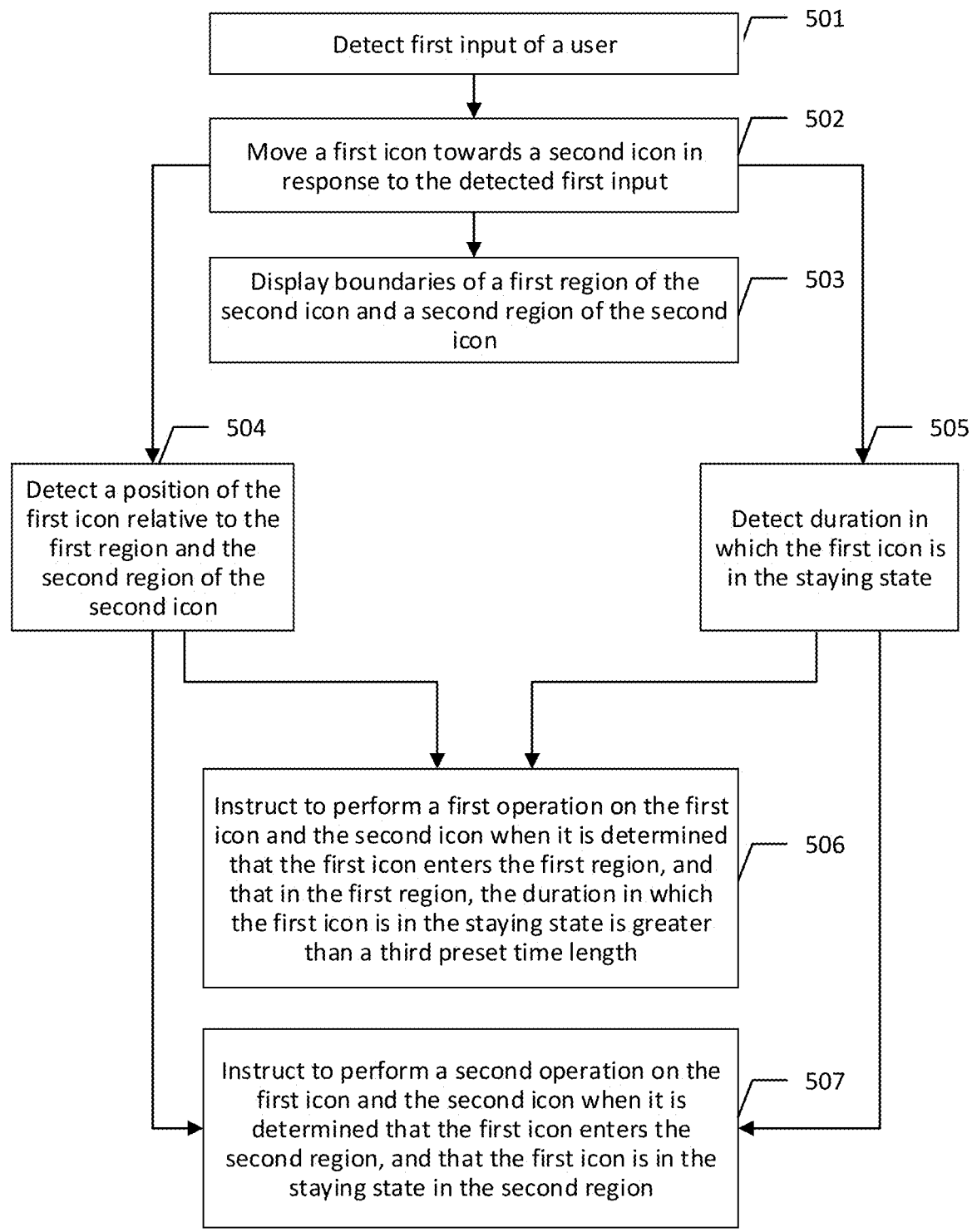
FIG. 5 is another schematic flowchart of an icon control method according to an embodiment of the present disclosure.

The following describes in detail an icon control method in an embodiment of the present disclosure. Referring to FIG. 5, another embodiment of the icon control method in this embodiment of the present disclosure includes the following steps.

501. Detect first input of a user.

When in an icon editing state, a terminal detects the first input of the user, where the terminal displays a first icon and a second icon, and the first icon and the second icon are two different icons.

502. Move the first icon towards the second icon in response to the detected first input.

After detecting the first input, the terminal moves the first icon towards the second icon in response to the detected first input.

It may be understood that, there may be many icons in a user interface of the terminal, and the terminal moves the first icon towards the second icon according to the first input. The second icon is a target icon of the user. The terminal may determine the second icon, that is, the target icon of the user, according to information in the first input, such as a direction in which or a speed at which the user moves the first icon. For example, the user touches and holds to move the first icon in a direction, and any one of icons (for example, three possible icons A, B, and C in order from near to far) in the direction may be the second icon. The terminal further detects a speed at which the first icon is moved. If the first icon passes the icon A at a speed that exceeds a first preset speed value, the icon A is not the second icon. If a speed value of the first icon decreases to below a second preset speed value when almost reaching the icon B, the icon B is the target icon of the user, that is, the second icon. According to an operation indicated by the first input and performed on the first icon by the user, there may further be many manners of determining the second icon, which are not limited herein.

503. Display boundaries of a first region of the second icon and a second region of the second icon.

In a process of moving the first icon towards the second icon, the terminal may display the boundaries of the first region and the second region of the second icon.

It may be understood that, the first region or the second region may be in various regular or irregular shapes. Optionally, the second region may be a circular region whose center is a center point of the second icon and whose radius is a third preset distance, the first region is a region within a circular region whose center is the center point of the second icon and whose radius is a fourth preset distance, excluding the second region, where the fourth preset distance is greater than the third preset distance. Optionally, the second region is a region within an inner square frame of the second icon. A distance between each side of the inner square frame and the center point of the second icon is a fifth preset distance, the first region is a region within an outer square frame of the second icon, excluding the second region, where a distance between each side of the outer square frame and the center point of the second icon is a sixth preset distance, and the sixth preset distance is greater than the fifth preset distance. The first region or the second region may further be in another shape, which is not limited herein.

It may be understood that, displaying the boundaries of the first region and the second region is merely a user-friendly displaying manner of the user interface, which makes the user clearly know ranges of the first region and the second region that are set by the terminal. Actually, whether to instruct to perform a first operation or a second operation still depends on whether the first icon enters the first region and the second region and duration in which the first icon is in a staying state.

It may be understood that, in actual application, step 503 may either not be executed in some cases according to an actual requirement, in some other cases, not only the first region and the second region of the second icon may be displayed, but also first regions and second regions of all icons except the first icon in the user interface may be displayed, which is not limited herein.

504. Detect a position of the first icon relative to the first region and the second region of the second icon.

In the process of moving the first icon towards the second icon, the terminal detects the position of the first icon relative to the first region and the second region of the second icon, to determine whether the first icon enters the first region or the second region of the second icon.

It may be understood that, the first icon is displayed in the user interface as a two-dimensional graph that includes many points and whose area is not 0, and the first region of the second icon is also a two-dimensional graph whose area is not 0. It may be set that, when any point on the first icon enters the first region of the second icon, the first icon enters the first region of the second icon. Alternatively, it may be set that, only when a part of the first icon enters the first region of the second icon, the first icon enters the first region of the second icon. A proportion of this part in the first icon may be set according to a requirement. For example, it may be set that, once an eighth of the area of the first icon enters the first region of the second icon, the first icon enters the first region of the second icon, or another proportion may be set, which is not limited herein. A process of determining whether the first icon enters the second region of the second icon is similar to the foregoing process of determining whether the first icon enters the first region, and details are not described herein.

505. Detect duration in which the first icon is in a staying state.

In the process of moving the first icon towards the second icon, the terminal may detect the duration in which the first icon is in the staying state, to compare the duration with a third preset time length.

It should be noted that, a condition for determining the staying state is that a movement speed of the first icon is less than a preset speed threshold, that is, the first icon is in the staying state provided that the movement speed of the first icon is less than the preset speed threshold. Regardless of whether the first icon stays still at a point (a speed value is 0) or is in a moving state, the first icon keeps in the staying state provided that the movement speed of the first icon does not exceed the preset speed threshold in a process of moving within a range of distance or a region, and duration of the staying state can be accumulated.

It may be understood that, after the position of the first icon relative to the first region and the second region of the second icon is detected in step 504, it is determined whether a condition that "the first icon enters the first region of the second icon" is satisfied, after the duration in which the first icon is in the staying state is detected in step 505, it is determined whether a condition that "in the first region, the duration in which the first icon is in the staying state is greater than the third preset time length" is satisfied. The terminal instructs to perform the first operation on the first icon and the second icon only when both the two conditions are satisfied. Determining for the two conditions may be performed in various sequences.

Solution 4: First executing only step 504, and then executing step 505 after the condition is satisfied.

1. Step 504: Detect a position of the first icon relative to the first region and the second region of the second icon is executed.

2. In the process of moving the first icon towards the second icon, when determining that the first icon does not enter the first region, the terminal may continue to execute step 504: Detect a position of the first icon relative to the first region and the second region of the second icon.

3. The first icon continues to approach the second icon, and when determining that the first icon enters the first region, the terminal starts to execute step 505: Detect duration in which the first icon is in the staying state. It may be understood that, step 504 is still executed at the same time after step 505 starts to be executed.

4. When determining that the first icon enters the first region, and that in the first region, the duration in which the first icon is in the staying state is not greater than the third preset time length, the terminal may continue to execute step 505: Detect duration in which the first icon is in the staying state.

In the first region, the duration in which the first icon is in the staying state may have two cases. In a first case, in the first region, the duration in which the first icon is in the staying state is greater than the third preset time length. In a second case, the first icon continues to approach the second icon until the first icon enters the second region, and the duration in which the first icon is in the staying state is not greater than the third preset time length from the beginning to the end in the first region.

5. The terminal executes step 506 when determining that the first icon enters the first region, and that in the first region, the duration in which the first icon is in the staying state is greater than the third preset time length.

6. The first icon continues to approach the second icon, and the terminal executes step 507 when determining that the first icon enters the second region, and that the first icon is in the staying state in the second region.

Optionally, after the first icon enters the second region, it may be set that step 507 is executed only when the duration in which the first icon is in the staying state is greater than a fourth preset time length. Therefore, step 505 continues to be executed when the first icon enters the second region, and that in the second region, the duration in which the first icon is in the staying state is not greater than the fourth preset time length, or step 507 is executed when the first icon enters the second region, and that in the second region, the duration in which the first icon is in the staying state is greater than the fourth preset time length.

Solution 5: First executing only step 505, and then executing step 504 after the condition is satisfied.

1. Step 505: Detect duration in which the first icon is in the staying state is executed.

2. Step 505 continues to be executed when the duration in which the first icon is in the staying state is not greater than the third preset time length.

3. When the duration in which the first icon is in the staying state is greater than the third preset time length, step 504: Detect a position of the first icon relative to the first region and the second region of the second icon starts to be executed. It may be understood that, step 505 is executed at the same time.

In this case, the detected position of the first icon relative to the first region and the second region of the second icon may have the following several cases.

In a first case, the first icon does not yet enter the first region of the second icon, and in this case, the terminal may continue to execute step 504: Detect a position of the first icon relative to the first region and the second region of the second icon. Because both step 504 and step 505 have been executed at the same time, for a subsequent execution process, refer to the execution process in Solution 4, and details are not described herein.

In a second case, the first icon enters the first region of the second icon, the terminal removes, from recorded duration of the staying state, duration of the staying state recorded beyond the first region, cuts out duration in which the first icon is in the staying state when the first icon is in a first region, and determines whether the duration is greater than the third preset time length. If the duration is greater than the third preset time length, step 506 is executed, or if the duration is not greater than the third preset time length, step 505: Detect duration in which the first icon is in the staying state continues to be executed. Because both step 504 and step 505 have been executed at the same time, for a subsequent execution process, refer to the execution process in Solution 4, and details are not described herein.

In a third case, the first icon enters the second region, step 507 is executed.

Optionally, after the first icon enters the second region, it may be set that step 507 is executed only when the duration in which the first icon is in the staying state is greater than a fourth preset time length. Therefore, when determining that the first icon enters the second region, the terminal removes, from recorded duration of the staying state, duration of the staying state recorded beyond the second region, cuts out duration in which the first icon is in the staying state when the first icon is in the second region, and determines whether the duration is greater than the fourth preset time length. Step 505 continues to be executed when the first icon enters the second region, and that in the second region, the duration in which the first icon is in the staying state is not greater than the fourth preset time length, or step 507 is executed when the first icon enters the second region, and that in the second region, the duration in which the first icon is in the staying state is greater than the fourth preset time length.

Solution 6: Executing Step 504 and step 505 at the same time.

1. Step 504 and step 505 are executed.

2. In the process of moving the first icon towards the second icon, the terminal may continue to execute step 504 and step 505 when determining that the first icon does not enter the first region or the second region.

3. The terminal may continue to execute step 504 and step 505 when determining that the first icon enters the first region, and that in the first region, the duration in which the first icon is in the staying state is not greater than the third preset time length.

In the first region, the duration in which the first icon is in the staying state may have two cases. In a first case, in the first region, the duration in which the first icon is in the staying state is greater than the third preset time length. In a second case, the first icon continues to approach the second icon until the first icon enters the second region, and the duration in which the first icon is in the staying state is not greater than the third preset time length from the beginning to the end in the first region.

4. The terminal executes step 506 when determining that the first icon enters the first region, and that in the first region, the duration in which the first icon is in the staying state is greater than the third preset time length.

5. The first icon continues to approach the second icon, and the terminal executes step 507 when determining that the first icon enters the second region, and that the first icon is in the staying state in the second region.

Optionally, after the first icon enters the second region, it may be set that step 507 is executed only when the duration in which the first icon is in the staying state is greater than a fourth preset time length. Therefore, step 504 and step 505 continue to be executed when the first icon enters the second region, and that in the second region, the duration in which the first icon is in the staying state is not greater than the fourth preset time length, or step 507 is executed when the first icon enters the second region, and that in the second region, the duration in which the first icon is in the staying state is greater than the fourth preset time length.

It may be understood that, in the process of moving the first icon towards the second icon, the terminal further displays at the same time animation of moving the first icon towards the second icon.

506. Instruct to perform a first operation on the first icon and the second icon.

The terminal instructs to perform the first operation on the first icon and the second icon when the first icon enters the first region, and that in the first region, the duration in which the first icon is in the staying state is greater than the third preset time length.

It should be noted that, when instructing to perform the first operation on the first icon and the second icon, the terminal does not yet perform the first operation, but only displays an animated effect of performing the first operation. Then, there may be two cases. In a first case, the terminal receives a confirmation operation of the user, for example, dropping the icon, and at this moment, the terminal really performs the first operation. In a second case, the terminal receives a cancellation operation of the user, for example, receives input of the user continuing to move the first icon, and at this moment, the terminal continues to move the first icon in response to the input of the user, and does not perform the first operation.

507. Instruct to perform a second operation on the first icon and the second icon.

The terminal instructs to perform the second operation on the first icon and the second icon when the first icon enters the second region, and that the first icon is in the staying state in the second region.

Optionally, the terminal instructs to perform the second operation on the first icon and the second icon when the first icon enters the second region, and that in the second region, the duration in which the first icon is in the staying state is greater than the fourth preset time length.

It should be noted that, when instructing to perform the second operation on the first icon and the second icon, the terminal does not yet perform the second operation, but only displays an animated effect of performing the second operation. Then, there may be two cases. In a first case, the terminal receives a confirmation operation of the user, for example, dropping the icon, and at this moment, the terminal really performs the second operation. In a second case, the terminal receives a cancellation operation of the user, for example, receives input of the user continuing to move the first icon, and at this moment, the terminal continues to move the first icon in response to the input of the user, and does not perform the second operation.

Optionally, the first operation may be a replace operation or a push-away operation, and the second operation may be a combine operation. The instructing to perform a first operation on the first icon and the second icon may specifically include, if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

Optionally, the first operation is a combine operation, and second operation is a replace operation or a push-away operation. The instructing to perform a second operation on the first icon and the second icon may specifically include, if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

In this embodiment of the present disclosure, determining of whether a first icon enters a first region or a second region of a second icon plus determining of duration in which the first icon is in a staying state in the first region or the second region jointly determine whether to instruct to perform a first operation or a second operation. Therefore, a probability that a terminal falsely responds is reduced, and an interaction capability of the terminal is improved.

For ease of understanding, the following uses a specific application scenario to describe in detail the icon control method in this embodiment of the present disclosure.

Figure 6A:
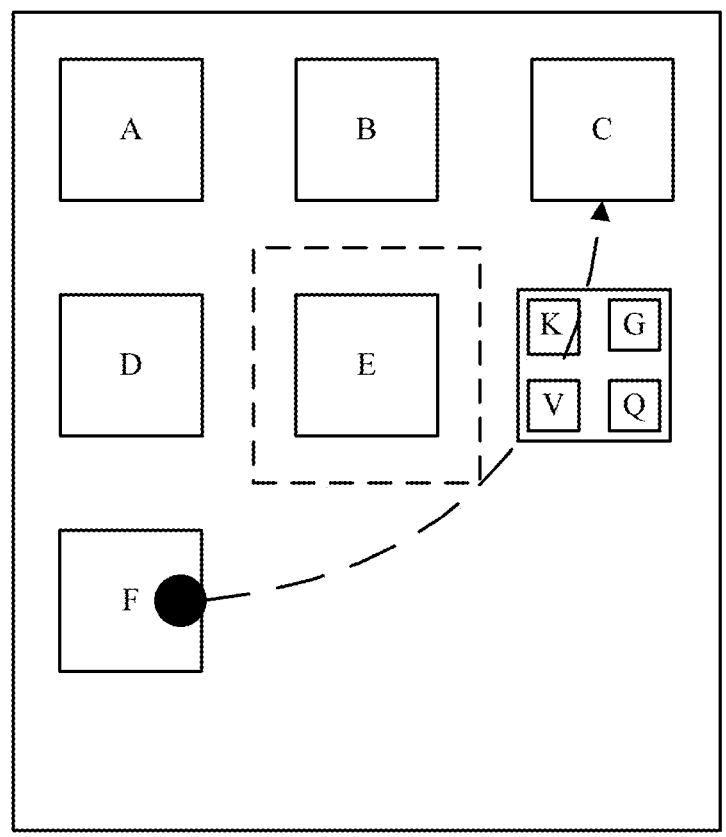
FIGS. 6A, 6B, 6C, 6D, and 6E are schematic diagrams of another instance of an icon control method according to an embodiment of the present disclosure.
Figure 6B:
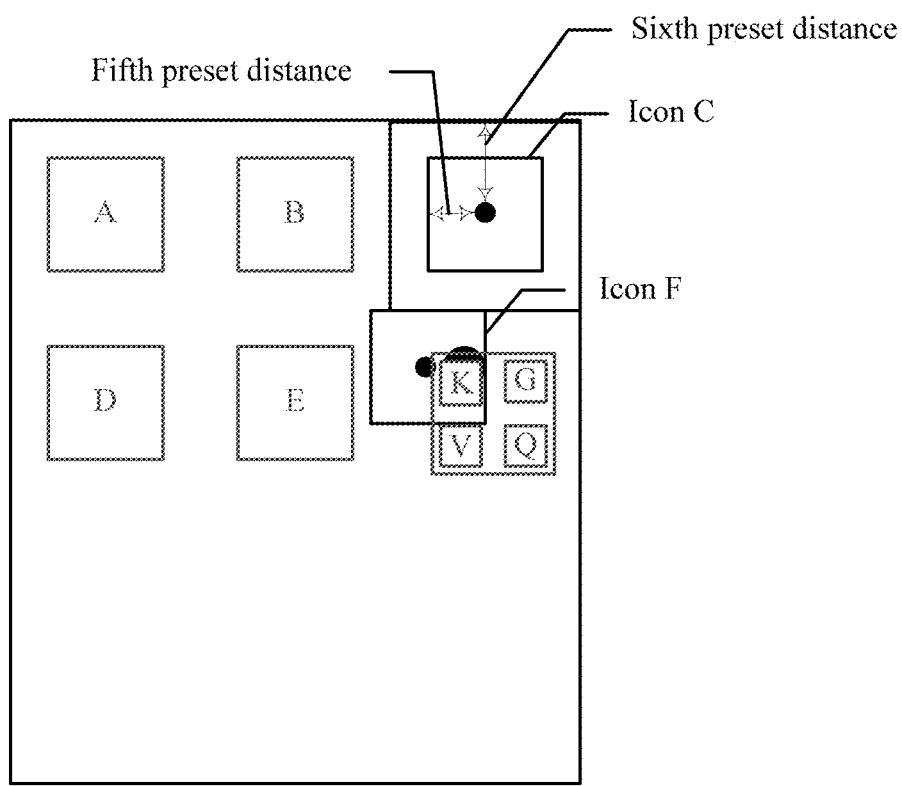
Figure 6C:
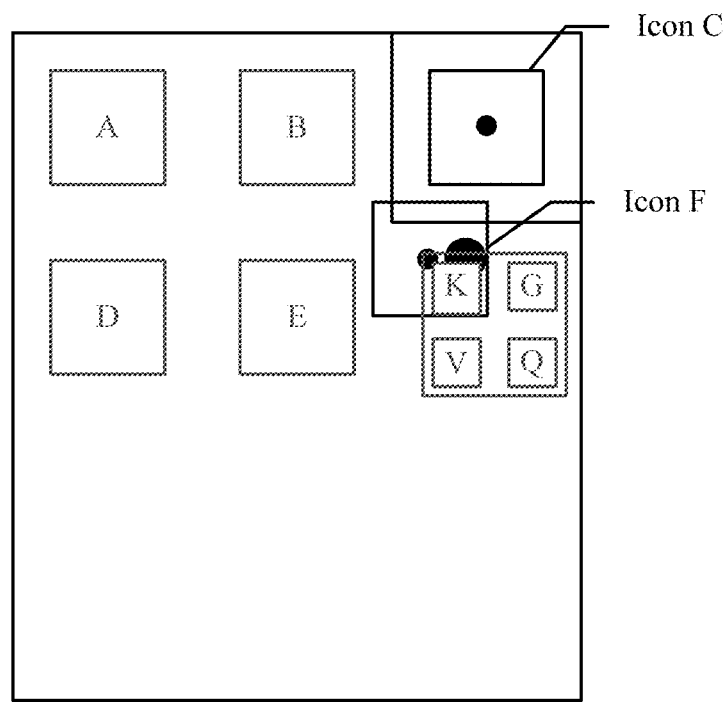
Figure 6D:
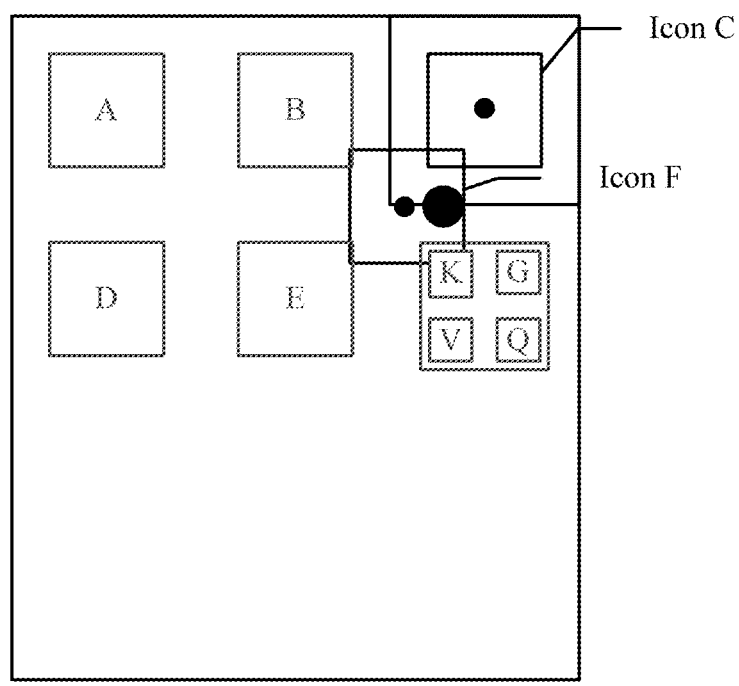

FIG. 6A shows a user interface of a terminal, and there are seven icons in the user interface, which are icons of application programs A, B, C, D, E, and F and a folder icon G. A first operation is set to a push-away operation, and a second operation is set to a combine operation. It is assumed that a user wants to perform the combine operation on the icon F and the icon C. In FIGS. 6B, 6C, and 6D, a small black dot represents a center point of an icon, and a big black dot in FIGS. 6A, 6B, 6C, and 6D represents a position touched and held by the user.

A finger of the user touches and holds the icon F for a period of time to enter an icon editing state, and in the icon editing state, the terminal detects input of the user: touching and holding to move the icon F towards the icon C.

In response to the input of the user, the terminal controls the icon F to move towards the icon C, and determines the icon F as a first icon.

In a process of moving towards the icon C, the icon F passes the icon G at a speed whose value exceeds a first preset speed, and the terminal determines that the folder icon G is not a second icon.

After the icon F passes the folder icon G, the speed reduces to less than a second preset speed, and the terminal determines that a next icon in this movement direction is a target icon of user, that is, determines that the icon C is the second icon.

As shown in FIG. 6B, the terminal displays an inner square frame and an outer square frame of the icon C, where the inner square frame is a second region of the icon C, and a region between the inner square frame and the outer square frame is a first region of the icon C, a distance between each side of the inner square frame and a center point of the icon C is 0.6 times a side length (a fifth preset distance) of a grid in which the icon is located, that is, the second region exactly overlaps a region in which the icon is located, a distance between each side of the outer square frame and the center point of the icon C is the side length (a sixth preset distance) of the grid in which the icon is located, and an area of the outer square frame exactly overlaps the grid in which the icon is located.

The icon F continues to approach the icon C, and the terminal detects whether the icon F enters the first region or the second region of the icon C.

At the same time, the terminal detects whether the speed value of the icon F is less than a preset speed threshold, and if the speed value is less than the preset speed threshold, determines that a staying state appears. If the staying state appears, the terminal detects duration of the staying state, and compares the duration with a third preset time length.

As shown in FIG. 6C, the icon F enters the first region of the icon C but does not yet enter the second region, and although the terminal detects that the icon F occasionally enters the staying state, the terminal does not instruct to perform the push-away operation on the icon C and the icon F because duration in which the staying state appears each time does not reach the third preset time length.

Figure 6E:
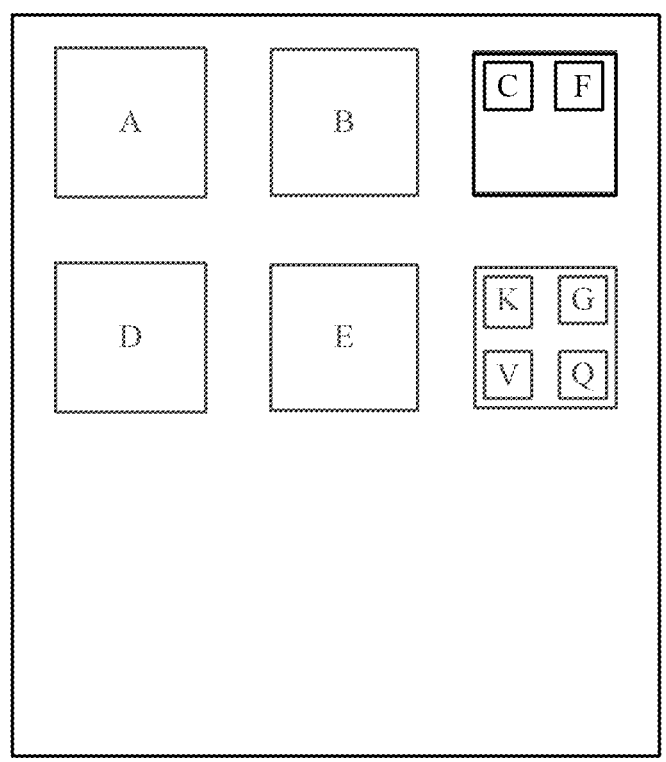

As shown in FIG. 6D, the icon F enters the second region, and the terminal detects that the icon F enters the staying state, instructs to perform the combine operation on the icon C and the icon F, and displays an animated effect of the icon C and the icon F being combined into one folder icon, as shown in FIG. 6E.

When receiving input of the user withdrawing the finger, the terminal performs the combine operation on the icon C and the icon F, to combine the icon C and the icon F into one folder icon.

Figure 7:
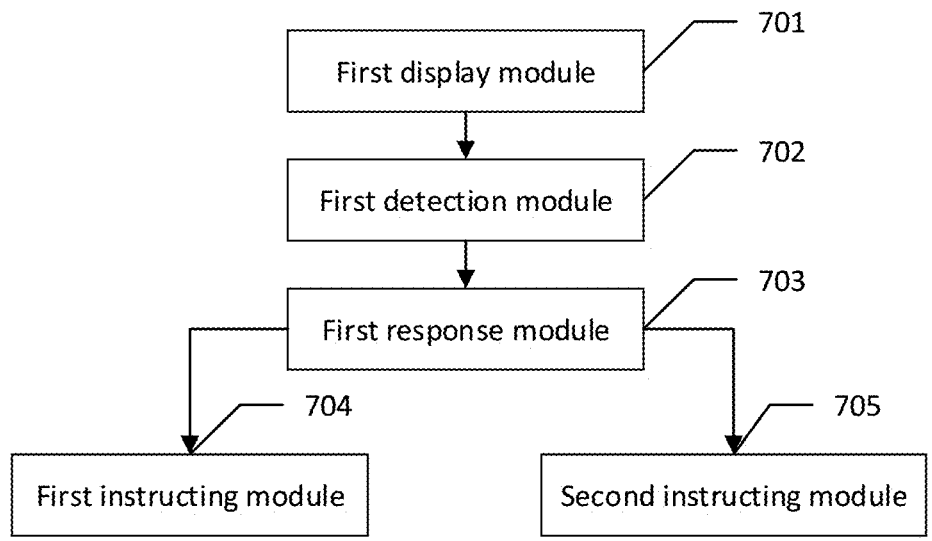
FIG. 7 is a schematic structural diagram of a terminal according to an embodiment of the present disclosure.

The following describes a terminal in an embodiment of the present disclosure. Referring to FIG. 7, an embodiment of the terminal in this embodiment of the present disclosure includes a first display module 701, configured to display a first icon and a second icon, a first detection module 702, configured to detect first input of a user, a first response module 703, configured to move the first icon towards the second icon in response to the first input detected by the first detection module 702, a first instructing module 704, configured to instruct to perform a first operation on the first icon and the second icon when a distance between the first icon and the second icon falls within a first distance range, and that in the first distance range, duration in which the first icon is in a staying state is greater than a first preset time length, where two endpoints of the first distance range are respectively a first preset distance and a second preset distance, and the second preset distance is less than the first preset distance, and a second instructing module 705, configured to instruct to perform a second operation on the first icon and the second icon when the distance between the first icon and the second icon falls within a second distance range, and that the first icon is in the staying state in the second distance range, where two endpoints of the second distance range are respectively 0 and the second preset distance, the second preset distance is not less than 0, and the second operation is an operation different from the first operation.

In this embodiment of the present disclosure, when a distance between a first icon and a second icon falls within a first distance range, and the first icon is in a staying state, before instructing to perform the first operation, a first instructing module 704 further needs to determine that in the first distance range, duration in which the first icon is in the staying state is greater than a first preset time length. In this way, if a second operation needs to be performed on the first icon and the second icon, when the first icon passes the first distance range in a process of approaching the second icon, it is determined whether the duration in which the first icon is in the staying state is greater than the first preset time length. If the duration is not greater than the first preset time length, it indicates that the first operation does not need to be performed on the first icon and the second icon, and the first instructing module 704 avoids an incorrect operation of instructing to perform the first operation simply because the first icon momentarily enters the staying state. Therefore, a probability that the terminal falsely responds is greatly reduced, and without affecting a user's original operation habit, an interaction capability of the terminal is improved.

Figure 8:
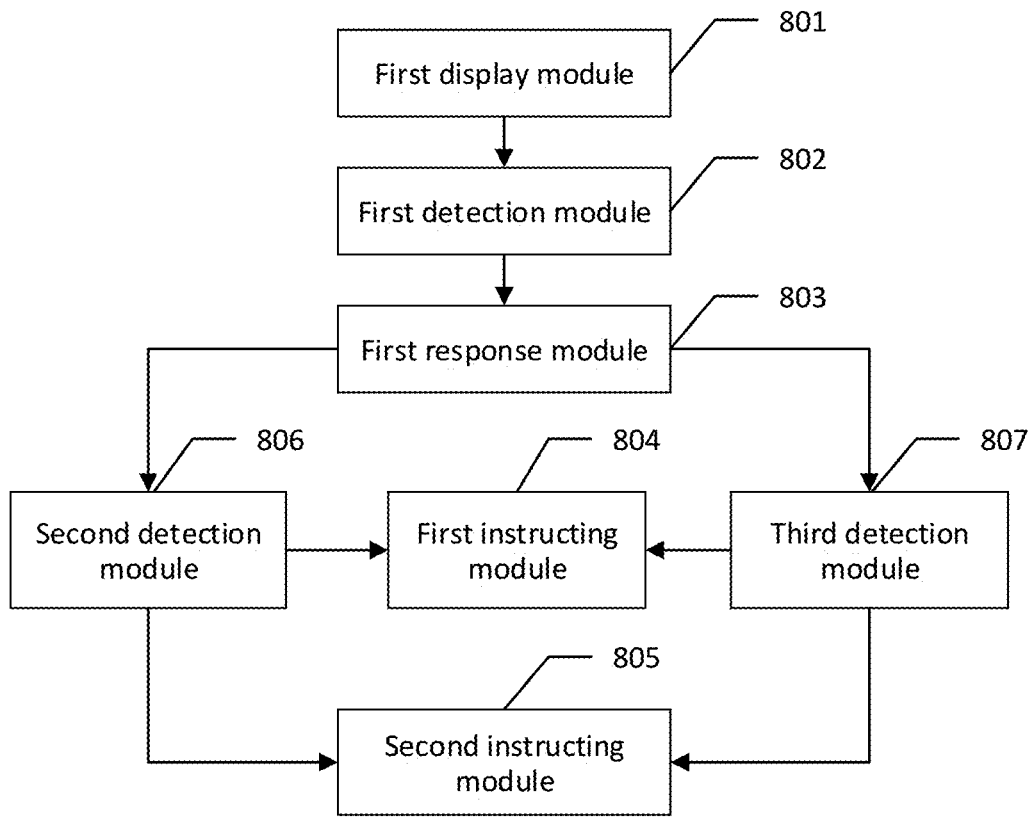
FIG. 8 is another schematic structural diagram of a terminal according to an embodiment of the present disclosure.

The following describes in detail a terminal in an embodiment of the present disclosure. Referring to FIG. 8, another embodiment of the terminal in this embodiment of the present disclosure includes a first display module 801, configured to display a first icon and a second icon, a first detection module 802, configured to detect first input of a user, a first response module 803, configured to move the first icon towards the second icon in response to the first input detected by the first detection module 802, a first instructing module 804, configured to instruct to perform a first operation on the first icon and the second icon when a distance between the first icon and the second icon falls within a first distance range, and that in the first distance range, duration in which the first icon is in a staying state is greater than a first preset time length, where two endpoints of the first distance range are respectively a first preset distance and a second preset distance, and the second preset distance is less than the first preset distance, and a second instructing module 805, configured to instruct to perform a second operation on the first icon and the second icon when the distance between the first icon and the second icon falls within a second distance range, and that the first icon is in the staying state in the second distance range, where two endpoints of the second distance range are respectively 0 and the second preset distance, the second preset distance is not less than 0, and the second operation is an operation different from the first operation.

In this embodiment, the terminal further includes a second detection module 806, configured to detect the distance between the first icon and the second icon, and a third detection module 807, configured to detect the duration in which the first icon is in the staying state.

The second detection module 806 is further configured to detect the distance between the first icon and the second icon when the distance between the first icon and the second icon falls beyond the first distance range and the second distance range.

The third detection module 807 is further configured to, when the distance between the first icon and the second icon falls within the first distance range, and that in the first distance range, the duration in which the first icon is in the staying state is not greater than the first preset time length, detect the duration in which the first icon is in the staying state.

Optionally, the first display module 801 is further configured to display an inner circular frame and an outer circular frame with a center at a center point of the second icon, where a radius of the inner circular frame is set to the second preset distance, and a radius of the outer circular frame is set to the first preset distance.

Optionally, the first operation may be a replace operation or a push-away operation, and the second operation may be a combine operation. The first instructing module 804 may be specifically configured to instruct to perform the replace operation on the first icon and the second icon when the distance between the first icon and the second icon falls within the first distance range, that in the first distance range, the duration in which the first icon is in the staying state is greater than the first preset time length, and that an initial position of the first icon is adjacent to an initial position of the second icon, or instruct to perform the push-away operation on the first icon and the second icon when the distance between the first icon and the second icon falls within the first distance range, that in the first distance range, the duration in which the first icon is in the staying state is greater than the first preset time length, and that an initial position of the first icon is adjacent to an initial position of the second icon.

Optionally, the second instructing module 805 may be specifically configured to instruct to perform the second operation on the first icon and the second icon when the distance between the first icon and the second icon falls within the second distance range, and that in the second distance range, the duration in which the first icon is in the staying state is greater than a second preset time length.

Optionally, the third detection module 807 may be further configured to, when the distance between the first icon and the second icon falls within the second distance range, and that in the second distance range, the duration in which the first icon is in the staying state is not greater than the second preset time length, detect the duration in which the first icon is in the staying state.

In this embodiment of the present disclosure, a second detection module 806 detects a distance between a first icon and a second icon, and a third detection module 807 detects duration in which the first icon is in a staying state, to jointly determine whether to instruct to perform a first operation or a second operation. Therefore, a probability that a terminal falsely responds is reduced, and an interaction capability of the terminal is improved.

Figure 9:
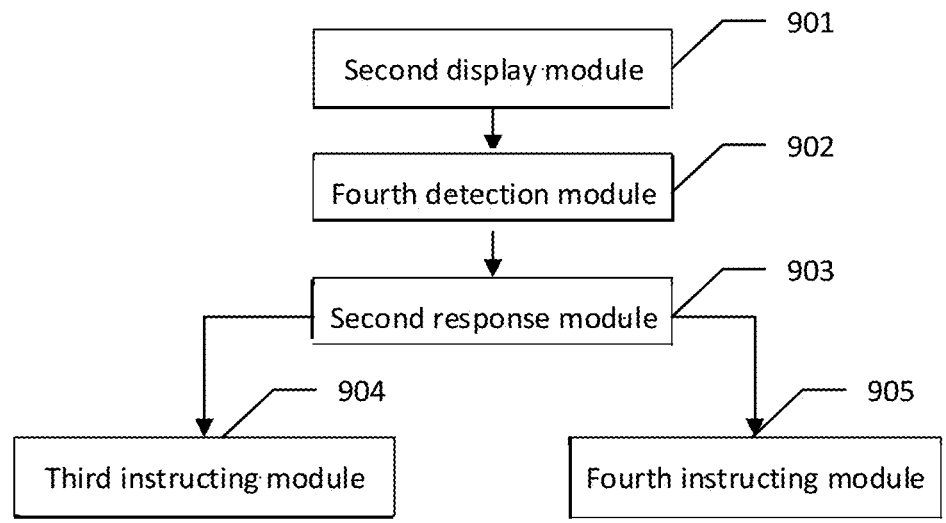
FIG. 9 is another schematic structural diagram of a terminal according to an embodiment of the present disclosure.

In the foregoing embodiment, a distance between a first icon and a second icon is used as a condition for determining whether to perform an operation. In actual application, whether the first icon enters a region of the second icon may also be used as a condition for determining whether to perform an operation. Referring to FIG. 9, another embodiment of a terminal in an embodiment of the present disclosure includes a second display module 901, configured to display a first icon and a second icon, a fourth detection module 902, configured to detect first input of a user, a second response module 903, configured to move the first icon towards the second icon in response to the first input detected by the fourth detection module, a third instructing module 904, configured to instruct to perform a first operation on the first icon and the second icon when the first icon enters a first region of the second icon, and that in the first region, duration in which the first icon is in a staying state is greater than a third preset time length, and a fourth instructing module 905, configured to instruct to perform a second operation on the first icon and the second icon when the first icon enters a second region of the second icon, and that the first icon is in the staying state in the second region, where a center point of the second icon falls within the second region, the second region and the first region do not overlap, and the second region is surrounded by the first region.

In this embodiment of the present disclosure, a third instructing module 904 does not immediately instruct to perform a first operation when a first icon enters a first region of a second icon and is in a staying state, but instructs to perform the first operation only after duration in which the first icon is in the staying state is greater than a third preset time length. In this way, if a second operation needs to be performed on the first icon and the second icon, when the first icon passes the first region of the second icon in a process of approaching the second icon, the third instructing module 904 avoids an incorrect operation of instructing to perform the first operation simply because the first icon momentarily enters the staying state. Therefore, a probability that the terminal falsely responds is greatly reduced, and without affecting a user's original operation habit, an interaction capability of the terminal is improved.

Figure 10:
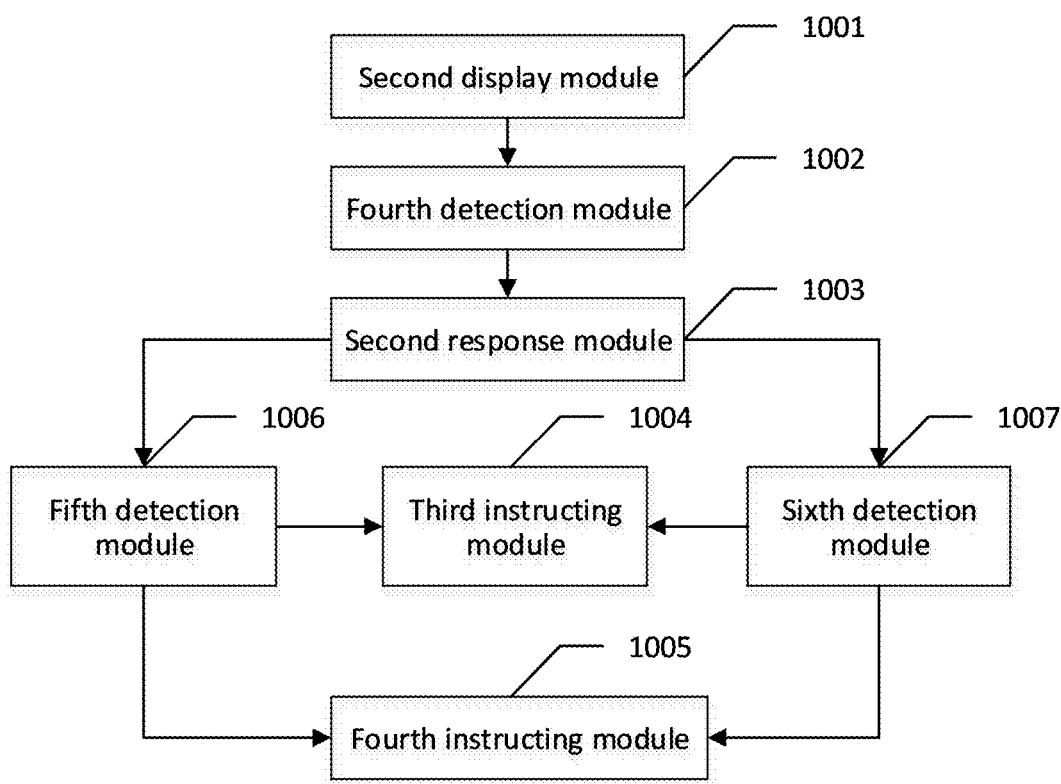
FIG. 10 is another schematic structural diagram of a terminal according to an embodiment of the present disclosure.

The following describes in detail a terminal in an embodiment of the present disclosure. Referring to FIG. 10, another embodiment of the terminal in this embodiment of the present disclosure includes a second display module 1001, configured to display a first icon and a second icon, a fourth detection module 1002, configured to detect first input of a user, a second response module 1003, configured to move the first icon towards the second icon in response to the first input detected by the fourth detection module, a third instructing module 1004, configured to instruct to perform a first operation on the first icon and the second icon when the first icon enters a first region of the second icon, and that in the first region, duration in which the first icon is in a staying state is greater than a third preset time length, and a fourth instructing module 1005, configured to instruct to perform a second operation on the first icon and the second icon when the first icon enters a second region of the second icon, and that the first icon is in the staying state in the second region, where a center point of the second icon falls within the second region, the second region and the first region do not overlap, and the second region is surrounded by the first region.

In this embodiment, the terminal further includes a fifth detection module 1006, configured to detect a position of the first icon relative to the first region and the second region of the second icon, and a sixth detection module 1007, configured to detect the duration in which the first icon is in the staying state.

The fifth detection module 1006 is further configured to, when the first icon does not yet enter the first region of the second icon, detect the position of the first icon relative to the first region and the second region of the second icon.

The sixth detection module 1007 is further configured to, when the first icon enters the first region of the second icon, and that in the first region, the duration in which the first icon is in the staying state is not greater than the third preset time length, detect the duration in which the first icon is in the staying state.

Optionally, the second display module 1001 is further configured to display boundaries of the first region and the second region.

Optionally, the first operation may be a replace operation or a push-away operation, and the second operation may be a combine operation. The third instructing module 1004 may be specifically configured to instruct to perform the replace operation on the first icon and the second icon when the first icon enters the first region of the second icon, that in the first region, the duration in which the first icon is in the staying state is greater than the third preset time length, and that an initial position of the first icon is adjacent to an initial position of the second icon, or instruct to perform the push-away operation on the first icon and the second icon when the first icon enters the first region of the second icon, that in the first region, the duration in which the first icon is in the staying state is greater than the third preset time length, and that an initial position of the first icon is adjacent to an initial position of the second icon.

Optionally, the second region is a circular region whose center is the center point of the second icon and whose radius is a third preset distance, the first region is a region within a circular region whose center is the center point of the second icon and whose radius is a fourth preset distance, excluding the second region, where the fourth preset distance is greater than the third preset distance.

Optionally, the second region is a region within an inner square frame of the second icon. A distance between each side of the inner square frame and the center point of the second icon is a fifth preset distance, the first region is a region within an outer square frame of the second icon, excluding the second region, where a distance between each side of the outer square frame and the center point of the second icon is a sixth preset distance, and the sixth preset distance is greater than the fifth preset distance.

Optionally, the fourth instructing module 1005 may be specifically configured to instruct to perform the second operation on the first icon and the second icon when the first icon enters the second region of the second icon, and that in the second region, the duration in which the first icon is in the staying state is greater than a fourth preset time length.

Optionally, the sixth detection module 1007 is further configured to, when the first icon enters the second region of the second icon, and that in the second region, the duration in which the first icon is in the staying state is not greater than the fourth preset time length, detect the duration in which the first icon is in the staying state.

In this embodiment of the present disclosure, a third instructing module 1004 and a fourth instructing module 1005 respectively determine whether a first icon enters a first region or a second region of a second icon and duration in which the first icon is in a staying state in the first region or the second region, to jointly determine whether to instruct to perform a first operation or a second operation. Therefore, a probability that a terminal falsely responds is reduced, and an interaction capability of the terminal is improved.

Figure 11:
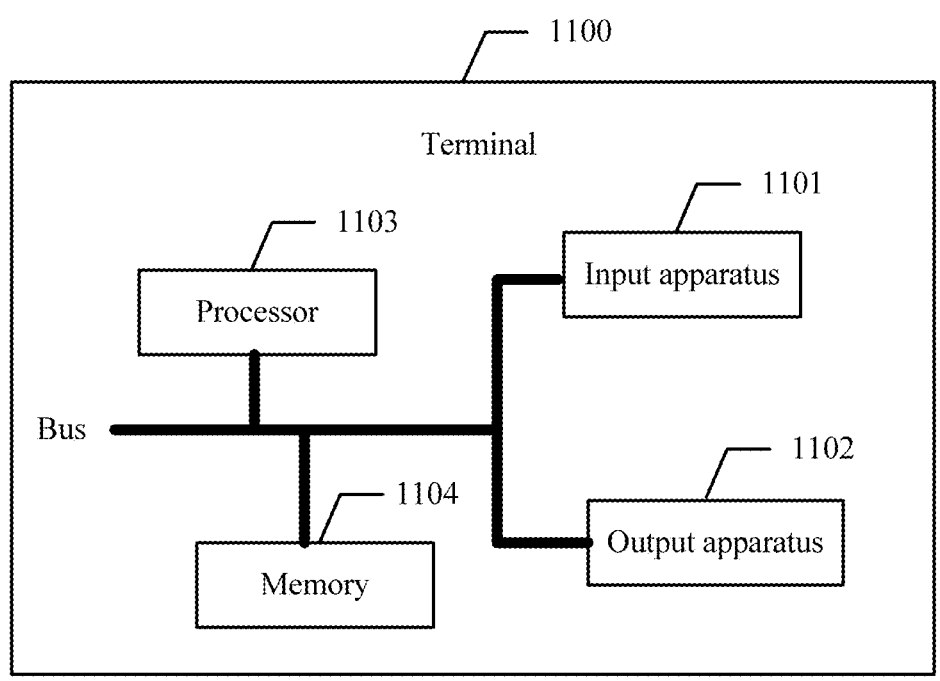
FIG. 11 is another schematic structural diagram of a terminal according to an embodiment of the present disclosure.

FIG. 11 is another schematic structural diagram of a terminal according to an embodiment of the present disclosure.

Another embodiment of a terminal 1100 in this embodiment of the present disclosure includes an input apparatus 1101, an output apparatus 1102, a processor 1103, and a memory 1104 (the terminal 1100 may have one or more processors 1103, and that the terminal 1100 has one processor 1103 is used as an example in FIG. 11). In some embodiments of the present disclosure, the input apparatus 1101, the output apparatus 1102, the processor 1103, and the memory 1104 may be connected and communicate by using a bus or in another manner, and connection by using a bus is used as an example in FIG. 11.

The input apparatus 1101 is configured to implement interaction between a user and an electronic device and/or input information into the electronic device. For example, the input apparatus 1101 may receive digit information or character information input by the user, so as to generate signal input related to user setting or function control. In a specific implementation manner of the present disclosure, the input apparatus 1101 may be a touch panel. The touch panel, which is also referred to as a touchscreen, can collect the user's operation action of touching or approaching the touch panel, for example, an operation action performed on the touch panel or at a position near the touch panel by the user by using a finger, a stylus, or any proper object or accessory, and drives a corresponding connection apparatus according to a preset program. Optionally, the touch panel may include two parts a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor 1103. The touch controller may further receive and execute a command sent by the processor 1103. In addition, the touch panel may be implemented in multiple types, such as a resistive type, a capacitive type, an infrared (IR) ray, and a surface acoustic wave.

The processor 1103 is a control center of the electronic device, and is connected to various parts of the entire electronic device by using various user interfaces and lines, and performs various functions of the electronic device and/or processes data by running or executing a software program and/or a module stored in the memory 1104 and by invoking data stored in the memory 1104. The processor 1103 may be constituted by an integrated circuit (IC), for example, may be constituted by a single packaged IC, or may be constituted by connecting multiple packaged ICs that have a same function or different functions. For example, the processor 1103 may include only a central processing unit (CPU), or may be a combination of a graphics processing unit (GPU), a digital signal processor (DSP), and a control chip (for example, a baseband chip) in a communications unit. In this implementation manner of the present disclosure, the CPU may be a single computing core, or may include multiple computing cores.

The output apparatus 1102 includes but is not limited to an image output unit. The image output unit is configured to output a text, a picture, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display or a display using an interferometric modulation of light technology. The image output unit may include a single display or multiple displays of different sizes. In a specific implementation manner of the present disclosure, the touch panel used by the foregoing input apparatus 1101 may also be used as the display panel of the output apparatus 1102. For example, after detecting a gesture operation of touching or approaching the touch panel, the touch panel transmits the gesture operation to the processor 1103 to determine a type of a touch event. Subsequently, the processor 1103 provides corresponding visual output on the display panel according to the type of the touch event. In FIG. 11, although the input apparatus 1101 and the output apparatus 1102 are used as two independent parts to implement input and output functions of the electronic device, in some embodiments, the touch panel and the display panel may be integrated to implement the input and output functions of the electronic device. For example, the image output unit may display various graphical user interfaces (GUI), so as to use the graphical user interfaces as virtual control components, and the graphical user interfaces include but are not limited to a window, a scrollbar, an icon, and a scrapbook, so that a user performs an operation in a touch manner.

The memory 1104 may be configured to store a software program and a module, and the processor 1103 executes various functional applications of the electronic device and implements data processing by running the software program and the module that are stored in the memory 1104. The memory 1104 mainly includes a program storage area and a data storage area. The program storage area may store an operating system, and an application program such as a sound playing program or an image playing program that is required by at least one function. The data storage area may store data (such as audio data or a phone book) that is created according to use of the electronic device, and the like. In a specific implementation manner of the present disclosure, the memory 1104 may include a volatile memory, such as a non-volatile random access memory (NVRAM), a phase change random access memory (PRAM), or a magnetoresistive random access memory (MRAM), or may include a non-volatile memory, such as at least one magnetic disk storage device, an electrically erasable programmable read-only memory (EEPROM), or a flash memory device, such as an NOR flash memory or an NAND flash memory. The non-volatile memory stores an operating system and an application program that are executed by the processor 1103. The processor 1103 loads, from the non-volatile memory, a running program and data to a memory, and stores digital content to a mass storage apparatus. The operating system includes various components and/or drivers that are configured to control and manage regular system tasks, for example, memory management, control of a storage device, and power management, and facilitate communication between various software and hardware. In this implementation manner of the present disclosure, the operating system may be an Android® system of Google®, an iOS® system developed by Apple®, a Windows® operating system developed by Microsoft®, or the like, or an embedded operating system such as Vxworks®.

The application program includes any application installed on the electronic device, and includes but is not limited to a browser, an email, an instant messaging service, word processing, a virtual keyboard, a window widget, encryption, digital copyright management, voice recognition, voice duplication, positioning (such as a function provided by the Global Positioning System), music play, or the like.

The terminal further includes a communications unit, a power supply, and the like.

The communications unit is configured to establish a communication channel, so that the terminal connects to a remote server by using the communication channel, and downloads media data from the remote server. The communications unit may include a communications module such as a wireless local area network (WLAN) module, a Bluetooth® module, and a baseband module, and a radio frequency (RF) circuit corresponding to the communications module, and is configured to perform wireless local area network communication, Bluetooth communication, infrared ray communication and/or cellular communication system communication, such as Wideband Code Division Multiple Access (W-CDMA) and/or High Speed Downlink Packet Access (HSDPA). The communications module is configured to control communication between all components in the terminal, and may support direct memory access (DMA).

The power supply is configured to supply power to different parts of the electronic device to maintain running of the parts. Generally, the power supply may be a built-in battery, for example, a common lithium-ion battery or a nickel metal hydride battery, or may include an external power supply that directly supplies power to the electronic device, for example, an alternating current (AC) adapter. In some implementation manners of the present disclosure, the power supply may further be defined in a wider scope, for example, may further include a power management system, a power charging system, a power failure detection circuit, a power converter or inverter, a power status indicator (such as a light-emitting diode), and any other components related to power generation, management, and distribution of the electronic device.

In this embodiment, the input apparatus 1101 may be specifically configured to detect first input of a user.

By invoking an operation instruction stored in the memory 1104, the processor 1103 is configured to move the first icon towards the second icon in response to the detected first input, when determining that a distance between the first icon and the second icon falls within a first distance range, and that in the first distance range, duration in which the first icon is in a staying state is greater than a first preset time length, instruct the output unit to instruct to perform a first operation on the first icon and the second icon, where two endpoints of the first distance range are respectively a first preset distance and a second preset distance, and the second preset distance is less than the first preset distance, and when determining that the distance between the first icon and the second icon falls within a second distance range, and that the first icon is in the staying state in the second distance range, instruct the output apparatus to instruct to perform a second operation on the first icon and the second icon, where two endpoints of the second distance range are respectively 0 and the second preset distance, the second preset distance is not less than 0, and the second operation is an operation different from the first operation.

The output apparatus 1102 is configured to instruct to perform the first operation on the first icon and the second icon, or instruct to perform the second operation on the first icon and the second icon according to an instruction of the processor 103.

In some embodiments of the present disclosure, the processor 1103 is further configured to detect the distance between the first icon and the second icon, detect the duration in which the first icon is in the staying state, continuing to detect the distance between the first icon and the second icon when determined that the distance between the first icon and the second icon falls beyond the first distance range and the second distance range, and continuing to detect the duration in which the first icon is in the staying state when determined that the distance between the first icon and the second icon falls within the first distance range, and that in the first distance range, the duration in which the first icon is in the staying state is not greater than the first preset time length.

In some embodiments of the present disclosure, the processor 1103 is further configured to display an inner circular frame and an outer circular frame with a center at a center point of the second icon, where a radius of the inner circular frame is set to the second preset distance, and a radius of the outer circular frame is set to the first preset distance.

In some embodiments of the present disclosure, the distance between the first icon and the second icon is specifically a distance between a center point of the first icon and the center point of the second icon.

In some embodiments of the present disclosure, the first operation is a replace operation or a push-away operation, and the second operation is a combine operation. When executing the step of instructing to perform a first operation on the first icon and the second icon, the processor 1103 specifically executes the following step: if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

In some embodiments of the present disclosure, the processor 1103 specifically executes the following step: instructing to perform the second operation on the first icon and the second icon when determining that the distance between the first icon and the second icon falls within the second distance range, and that in the second distance range, the duration in which the first icon is in the staying state is greater than a second preset time length.

In some embodiments of the present disclosure, the processor 1103 is further configured to continuing to detect the duration in which the first icon is in the staying state when determined that the distance between the first icon and the second icon falls within the second distance range, and that in the second distance range, the duration in which the first icon is in the staying state is not greater than the second preset time length.

For ease of understanding the foregoing embodiment, the following describes an interaction process of the foregoing components of the terminal in a specific application scenario.

When the user uses the terminal, the input apparatus 1101 captures a touching and holding operation of a finger on a folder thumbnail, and transmits the operation to the processor 1103. The processor 1103 sends an instruction to the output apparatus 1102, and the output apparatus 1102 indicates that the icon enters an editing state. The input apparatus 1101 detects an operation of the user's finger dragging the icon, and transmits the operation (which includes a dragging parameter, such as a parameter required to calculate coordinates of a center point of the icon) to the processor 1103. The processor 1103 calculates a dragging speed, reads a preset speed threshold from the memory 1104, and compares the current dragging speed with the preset speed threshold. When the dragging speed is less than the preset speed threshold, the processor 1103 determines that the dragging of the users' finger stays, and calculates a first distance between the center point of the first icon and the center point of the second icon and a first staying time. The memory 1104 stores a calculating result. The processor 1103 reads a preset distance threshold and a preset staying time threshold from the memory 1104, and when the first distance is greater than the preset distance threshold, the processor 1103 compares the first staying time with the preset staying time threshold. When the first staying time is greater than the preset staying time, the processor 1103 sends an instruction of replacing or pushing away a target icon to the output apparatus 1102. When the first distance is less than the preset distance threshold, the processor 1103 sends an instruction of creating a file to the output apparatus 1102.

In the foregoing embodiment, a distance between a first icon and a second icon is used as a condition for determining whether to perform an operation; in actual application, whether the first icon enters a region of the second icon may also be used as a condition for determining whether to perform an operation.

A structure of another embodiment is the same as the structure of the embodiment shown in FIG. 11, and details are not described herein.

In this embodiment, the input apparatus 1101 may be specifically configured to detect first input of a user.

By invoking an operation instruction stored in the memory 1104, the processor 1103 is configured to move a first icon towards a second icon in response to the detected first input, when determining that the first icon enters a first region of the second icon, and that in the first region, duration in which the first icon is in a staying state is greater than a third preset time length, instruct the output apparatus to instruct to perform a first operation on the first icon and the second icon, and when determining that the first icon enters a second region of the second icon, and that the first icon is in the staying state in the second region, instruct the output apparatus to instruct to perform a second operation on the first icon and the second icon, where a center point of the second icon falls within the second region, the second region and the first region do not overlap, and the second region is surrounded by the first region.

The output apparatus 1102 is configured to instruct to perform the first operation on the first icon and the second icon, or instruct to perform the second operation on the first icon and the second icon according to an instruction of the processor 103.

In some embodiments of the present disclosure, the processor 1103 is further configured to execute the following steps: detecting a position of the first icon relative to the first region and the second region of the second icon, detecting the duration in which the first icon is in the staying state, when determining that the first icon does not yet enter the first region of the second icon, continuing to perform the detecting a position of the first icon relative to the first region and the second region of the second icon, and when determining that the first icon enters the first region of the second icon, and that in the first region, the duration in which the first icon is in the staying state is not greater than the third preset time length, continuing to perform the detecting the duration in which the first icon is in the staying state.

In some embodiments of the present disclosure, the second region is a circular region whose center is the center point of the second icon and whose radius is a third preset distance, the first region is a region within a circular region whose center is the center point of the second icon and whose radius is a fourth preset distance, excluding the second region, where the fourth preset distance is greater than the third preset distance, or the second region is a region within an inner square frame of the second icon, where a distance between each side of the inner square frame and the center point of the second icon is a fifth preset distance, the first region is a region within an outer square frame of the second icon, excluding the second region, where a distance between each side of the outer square frame and the center point of the second icon is a sixth preset distance, and the sixth preset distance is greater than the fifth preset distance.

In some embodiments of the present disclosure, the processor 1103 is further configured to execute the following steps: displaying boundaries of the first region and the second region.

In some embodiments of the present disclosure, the first operation is a replace operation or a push-away operation, and the second operation is a combine operation. When executing the step of instructing to perform a first operation on the first icon and the second icon, the processor 1103 specifically executes the following step: if an initial position of the first icon is adjacent to an initial position of the second icon, instructing to perform an operation of replacing the second icon by the first icon, or if an initial position of the first icon is adjacent to an initial position of the second icon, instructing to perform an operation of pushing away the second icon by the first icon.

In some embodiments of the present disclosure, the processor 1103 specifically executes the following step: instructing to perform the second operation on the first icon and the second icon when determining that the first icon enters the second region of the second icon, and that in the second region, the duration in which the first icon is in the staying state is greater than a fourth preset time length.

In some embodiments of the present disclosure, the processor 1103 is further configured to continuing to detect the duration in which the first icon is in the staying state when determining that the first icon enters the second region of the second icon, and that in the second region, the duration in which the first icon is in the staying state is not greater than the fourth preset time length.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some user interfaces. The indirect couplings or communication connections between the apparatuses or units may be implemented.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. An icon control method implemented by a terminal, comprising:
    displaying a first icon and a second icon on a display of the terminal;
    detecting a first user input;
    moving the first icon towards the second icon to a new position in response to the first user input;
    comparing, in response to the first icon being moved toward the second icon during the first user input, a current position of the first icon with a position of the second icon to determine whether a distance between the current position and the position is less than a first preset value and greater than a second preset value, or is less than the second preset value; and
    determining an animated effect of performing an operation before the operation is performed on the display based on the following:
        whether the distance between the current position of the first icon and the position of the second icon is less than a first preset value and greater than a second preset value, and a duration in which the first icon is located in the current position is greater than a first preset time length,
        whether the distance between the current position of the first icon and the position of the second icon is less than the second preset value, and the duration in which the first icon is located in the current position is greater than a second preset time length, or
        whether a speed of the first icon passing the second icon during the first user input exceeds a first preset speed.

2. The method according to claim 1, further comprising displaying, in response to the distance being less than the first preset value and greater than the second preset value and in response to the duration being greater than the first preset time length, the animated effect of performing a push-away operation prior to the push-away operation being performed on the display.

3. The method according to claim 1, further comprising displaying, in response to the distance being less than the second preset value and in response to the duration being greater than the second preset time length, the animated effect of performing a combine operation prior to the combine operation being performed on the display.

4. The method according to claim 1, further comprising determining, in response to the first icon passing the second icon during the first user input at the speed that exceeds the first preset speed, not to display the animated effect of performing a combine operation or a push away operation.

5. The method according to claim 1, wherein after moving the first icon towards the second icon, the method further comprises:
    displaying an inner circular frame and an outer circular frame with a center at a center point of the second icon;
    setting a radius of the inner circular frame to the second preset value; and
    setting a radius of the outer circular frame to the first preset value.

6. The method according to claim 2, wherein in response to displaying the animated effect of performing the push-away operation, the method further comprises performing the push-away operation in response to receiving a confirmation operation, and wherein the push-away operation comprises pushing away the second icon by the first icon.

7. The method according to claim 1, further comprising:
    determining a first speed of movement of the first icon while moving the first icon;
    determining a direction of the movement; and
    determining the second icon as a target icon based on the first speed and the direction.

8. The method of claim 7, further comprising determining that the second icon is the target icon in response to the first speed being less than a threshold and greater than zero and in response to the second icon being in the direction.

9. The method of claim 8, further comprising:
    displaying an inner circular frame and an outer circular frame with a center at a center point of the second icon in response to determining that the second icon is the target icon;
    setting a radius of the inner circular frame to the second preset value; and
    setting a radius of the outer circular frame to the first preset value.

10. A terminal, comprising:
    a display configured to display a first icon and a second icon;
    a memory configured to store instructions; and
    a processor coupled to the memory and to the display, wherein the processor is configured to execute the instructions to cause the terminal to be configured to:
        detect a first user input;
        move the first icon towards the second icon to a new position in response to the first user input;
        compare, when the first icon is moved toward the second icon during the first user input, a current position of the first icon with a position of the second icon to determine whether a distance between the current position and the position is less than a first preset value and greater than a second preset value, or is less than the second preset value; and
        determine an animated effect of performing an operation before the operation is performed on the display based on at least one of the following:
            whether the distance between the current position of the first icon and the position of the second icon is less than a first preset value and greater than a second preset value, and a duration in which the first icon is located in the current position is greater than a first preset time length, or is greater than a second preset time length,
            whether the distance between the current position of the first icon and the position of the second icon is less than the second preset value, and the duration in which the first icon is located in the current position is greater than a second preset time length, or
            whether a speed of the first icon passing the second icon during the first user input exceeds a first preset speed.

11. The terminal according to claim 10, wherein the processor is further configured to execute the instructions to cause the terminal to be configured to display, in response to the distance being less than the first preset value and greater than the second preset value and in response to the duration being greater than the first preset time length, the animated effect of performing a push-away operation prior to the push-away operation being performed on the display.

12. The terminal according to claim 10, wherein the processor is further configured to execute the instructions to cause the terminal to be configured to display, in response to the distance being less than the second preset value and in response to the duration being greater than the second preset time length, the animated effect of performing a combine operation prior to the combine operation being performed on the display.

13. The terminal according to claim 10, wherein the processor is further configured to execute the instructions to cause the terminal to be configured to determine, in response to the first icon passing the second icon during the first user input at the speed that exceeds the first preset speed, not to display the animated effect of performing a combine operation or a push away operation.

14. The terminal according to claim 10, wherein the display is further configured to display an inner circular frame and an outer circular frame, wherein a center of the inner circular frame and a center of the outer circular frame are at a center point of the second icon, wherein a radius of the inner circular frame is the second preset value, and wherein a radius of the outer circular frame is the first preset value.

15. The terminal according to claim 11, wherein the push-away operation comprises pushing away the second icon by the first icon.

16. The terminal according to claim 10, wherein the processor is further configured to execute the instructions to cause the terminal to be configured to:
determine a first speed of movement of the first icon while moving the first icon;
determine a direction of the movement; and
determine the second icon as a target icon based on the first speed and the direction.

17. The terminal according to claim 16, wherein the processor is further configured to execute the instructions to cause the terminal to be configured to determine that the second icon is the target icon when the first speed is less than a threshold and greater than zero and when the second icon is in the direction.

18. The terminal according to claim 17, wherein the processor is further configured to execute the instructions to cause the terminal to be configured to display an inner circular frame and an outer circular frame with a center at a center point of the second icon in response to the second icon being the target icon, and wherein the processor is further configured to execute the instructions to cause the terminal to be configured to:
set a radius of the inner circular frame to the second preset value; and set a radius of the outer circular frame to the first preset value.

19. A computer program product comprising instructions for storage on a non-transitory computer-readable medium that, when executed by a processor, cause a terminal to:
display a first icon and a second icon on a display;
detect a first user input;
move the first icon towards the second icon to a new position in response to the first user input;
compare, when the first icon is moved toward the second icon during the first user input, a current position of the first icon with a position of the second icon to determine whether a distance between the current position and the position is less than a first preset value and greater than a second preset value, or is less than the second preset value; and
determine an animated effect of performing an operation before the operation is performed on the display based on the following:
whether the distance between the current position of the first icon and the position of the second icon is less than a first preset value and greater than a second preset value, and a duration in which the first icon is located in the current position is greater than a first preset time length,
whether the distance between the current position of the first icon and the position of the second icon is less than the second preset value, and the duration in which the first icon is located in the current position is greater than a second preset time length, or
whether a speed of the first icon passing the second icon during the first user input exceeds a first preset speed.

20. The computer program product according to claim 19, wherein the instructions, when executed by the processor, cause the terminal to:
display, in response to the distance being less than the first preset value and greater than the second preset value and in response to the duration being greater than the first preset time length, the animated effect of performing a push-away operation prior to the push-away operation being performed on the display;
display, in response to the distance being less than the second preset value and in response to the duration being greater than the second preset time length, the animated effect of performing a combine operation prior to the combine operation being performed on the display; or
determine, in response to the first icon passing the second icon during the first user input at the speed that exceeds the first preset speed, not to display the animated effect of performing a combine operation or a push away operation.

* * * * *

UNITED STATES PATENT AND TRADEMARK OFFICE
CERTIFICATE OF CORRECTION

PATENT NO. : 11,301,126 B2
APPLICATION NO. : 16/990636
DATED : April 12, 2022
INVENTOR(S) : Zhenwei Shan et al.

It is certified that error appears in the above-identified patent and that said Letters Patent is hereby corrected as shown below:

In the Claims

Claim 10, Column 38, Lines 49-50: "length, or is greater than a second preset time length," should read "length,"

Signed and Sealed this
Twenty-eighth Day of June, 2022

Katherine Kelly Vidal
*Director of the United States Patent and Trademark Office*